Nov. 16, 1954 W. G. PAIGE 2,694,362

HIGH-SPEED DOT PRINTER

Filed Aug. 25, 1951 15 Sheets-Sheet 1

INVENTOR.
W. GRIFFIN PAIGE

BY Jh L Sterling

ATTORNEY

Nov. 16, 1954 W. G. PAIGE 2,694,362

HIGH-SPEED DOT PRINTER

Filed Aug. 25, 1951 15 Sheets-Sheet 2

INVENTOR.
W. GRIFFIN PAIGE
BY
J. L. Sterling
ATTORNEY

Nov. 16, 1954 W. G. PAIGE 2,694,362

HIGH-SPEED DOT PRINTER

Filed Aug. 25, 1951 15 Sheets-Sheet 3

INVENTOR.
W. GRIFFIN PAIGE

BY J. L. Sterling

ATTORNEY

Nov. 16, 1954 W. G. PAIGE 2,694,362

HIGH-SPEED DOT PRINTER

Filed Aug. 25, 1951 15 Sheets-Sheet 4

*INVENTOR.*
W. GRIFFIN PAIGE

*BY* J. L. Sterling

ATTORNEY

Nov. 16, 1954 W. G. PAIGE 2,694,362

HIGH-SPEED DOT PRINTER

Filed Aug. 25, 1951 15 Sheets-Sheet 5

INVENTOR.
W. GRIFFIN PAIGE

BY J. L. Sterling

ATTORNEY

INVENTOR.
W. GRIFFIN PAIGE
BY J. L. Sterling
ATTORNEY

FIG. 11

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 |
|---|---|---|---|---|---|---|---|---|---|---|---|---|---|---|---|---|---|---|---|---|---|---|---|---|---|---|---|---|---|---|---|---|---|---|---|
| A | | | X | | | | X | | X | | X | | | | X | X | | | | X | X | X | X | X | X | X | | | | X | X | | | | X |
| B | X | X | X | X | | X | | | | X | X | | | | X | X | X | X | X | | X | | | | X | X | | | | X | X | X | X | X | |
| C | | X | X | X | | X | | | | X | X | | | | | X | | | | | X | | | | | X | | | | X | | X | X | X | |
| D | X | X | X | X | | | X | | | X | X | | | | X | X | | | | X | X | | | | X | X | | | | X | X | X | X | X | |
| E | X | X | X | X | X | X | | | | | X | | | | | X | X | X | X | | X | | | | | X | | | | | X | X | X | X | X |
| F | X | X | X | X | X | X | | | | | X | | | | | X | | | | | X | | | | | X | | | | | X | X | X | X | X |
| G | X | X | X | X | | X | | | | | X | | | | | X | | | X | X | X | | | | X | X | | | | X | | X | X | X | X |
| H | X | | | | X | X | | | | X | X | | | | X | X | X | X | X | X | X | | | | X | X | | | | X | X | | | | X |
| I | | | X | | | | | X | | | | | X | | | | | X | | | | | X | | | | | X | | | | | X | | |
| J | | | | X | | | | | X | | | | | X | | | | | X | | | | | X | | | X | | X | | | | X | | |
| K | X | | | | X | X | | | X | | X | | | | | X | X | | | | X | | X | | | X | | | X | | X | | | | X |
| L | X | | | | | X | | | | | X | | | | | X | | | | | X | | | | | X | | | | | X | X | X | X | X |
| M | X | | | | X | X | X | | X | X | X | | X | | X | X | | X | | X | X | | | | X | X | | | | X | X | | | | X |
| N | X | | | | X | X | | | | X | X | X | | | X | X | | X | | X | X | | | X | X | X | | | | X | X | | | | X |
| O | | X | X | X | | X | | | | X | X | | | | X | X | | | | X | X | | | | X | X | | | | X | | X | X | X | |
| P | X | X | X | X | | X | | | | X | X | | | | X | X | X | X | X | | X | | | | | X | | | | | X | | | | |
| Q | | X | X | X | | X | | | | X | X | | | | X | X | | | | X | X | | | | X | X | | | X | X | | X | X | X | X |
| R | X | X | X | X | | X | | | | X | X | | | | X | X | X | X | X | | X | | X | | | X | | | X | | X | | | | X |
| S | | X | X | X | X | X | | | | | X | | | | | | X | X | X | | | | | | X | | | | | X | X | X | X | X | |
| T | X | X | X | X | X | | | X | | | | | X | | | | | X | | | | | X | | | | | X | | | | | X | | |
| U | X | | | | X | X | | | | X | X | | | | X | X | | | | X | X | | | | X | X | | | | X | | X | X | X | |
| V | X | | | | X | X | | | | X | X | | | | X | X | | | | X | X | | | | X | | X | | X | | | | X | | |
| W | X | | | | X | X | | | | X | X | | | | X | X | | X | | X | X | | X | | X | X | X | | X | X | X | | | | X |
| X | X | | | | X | X | | | | X | | X | | X | | | | X | | | | X | | X | | X | | | | X | X | | | | X |
| Y | X | | | | X | X | | | | X | | X | | X | | | | X | | | | | X | | | | | X | | | | | X | | |
| Z | X | X | X | X | X | | | | | X | | | | X | | | | X | | | | X | | | | X | | | | | X | X | X | X | X |
| 1 | | X | X | | | | | X | | | | | X | | | | | X | | | | | X | | | | | X | | | | X | X | X | |
| 2 | | X | X | X | | X | | | | X | | | | | X | | | X | X | | | X | | | | X | | | | | X | X | X | X | X |
| 3 | | X | X | X | | X | | | | X | | | | | X | | | X | X | | | | | | X | X | | | | X | | X | X | X | |
| 4 | | | | X | | | | X | X | | | X | | X | | X | | | X | | X | X | X | X | X | | | | X | | | | | X | |
| 5 | X | X | X | X | X | X | | | | | X | | | | | X | X | X | X | | | | | | X | | | | | X | X | X | X | X | |
| 6 | | | X | X | X | | X | | | | X | | | | | X | X | X | X | | X | | | | X | X | | | | X | | X | X | X | |
| 7 | X | X | X | X | X | | | | | X | | | | X | | | | X | | | | X | | | | X | | | | | X | | | | |
| 8 | | X | X | X | | X | | | | X | X | | | | X | | X | X | X | | X | | | | X | X | | | | X | | X | X | X | |
| 9 | | X | X | X | | X | | | | X | X | | | | X | | X | X | X | X | | | | | X | | | | X | | X | X | X | | |
| 0 | | X | X | X | | X | | | | X | X | | | X | X | | | | | X | X | | | | X | X | | | | X | | X | X | X | |

80 COL.

| | 1 | 2 | 3 | 4 | 5 | 6 | 7 | 8 | 9 | 0 | 11 | 12 |
|---|---|---|---|---|---|---|---|---|---|---|---|---|
| A | X | | | | | | | | | | | X |
| B | | X | | | | | | | | | | X |
| C | | | X | | | | | | | | | X |
| D | | | | X | | | | | | | | X |
| E | | | | | X | | | | | | | X |
| F | | | | | | X | | | | | | X |
| G | | | | | | | X | | | | | X |
| H | | | | | | | | X | | | | X |
| I | | | | | | | | | X | | | X |
| J | X | | | | | | | | | | X | |
| K | | X | | | | | | | | | X | |
| L | | | X | | | | | | | | X | |
| M | | | | X | | | | | | | X | |
| N | | | | | X | | | | | | X | |
| O | | | | | | X | | | | | X | |
| P | | | | | | | X | | | | X | |
| Q | | | | | | | | X | | | X | |
| R | | | | | | | | | X | | X | |
| S | | X | | | | | | | | X | | |
| T | | | X | | | | | | | X | | |
| U | | | | X | | | | | | X | | |
| V | | | | | X | | | | | X | | |
| W | | | | | | X | | | | X | | |
| X | | | | | | | X | | | X | | |
| Y | | | | | | | | X | | X | | |
| Z | | | | | | | | | X | X | | |
| 1 | X | | | | | | | | | | | |
| 2 | | X | | | | | | | | | | |
| 3 | | | X | | | | | | | | | |
| 4 | | | | X | | | | | | | | |
| 5 | | | | | X | | | | | | | |
| 6 | | | | | | X | | | | | | |
| 7 | | | | | | | X | | | | | |
| 8 | | | | | | | | X | | | | |
| 9 | | | | | | | | | X | | | |
| 0 | | | | | | | | | | X | | |

FIG. 12

FIG. 13

| | | | | |
|---|---|---|---|---|
| 1 | | | | 5 |
| 6 | 7 | | 9 | 10 |
| 11 | | 13 | | 15 |
| 16 | | 18 | | 20 |
| 21 | | | | 25 |
| 26 | | | | 30 |
| 31 | | | | 35 |

FIG. 14

| | | | | |
|---|---|---|---|---|
| 1 | 2 | 3 | 4 | 5 |
| 6 | 7 | 8 | 9 | 10 |
| 11 | 12 | 13 | 14 | 15 |
| 16 | 17 | 18 | 19 | 20 |
| 21 | 22 | 23 | 24 | 25 |
| 26 | 27 | 28 | 29 | 30 |
| 31 | 32 | 33 | 34 | 35 |

*INVENTOR.*
W. GRIFFIN PAIGE

*BY* J. L. Sterling

ATTORNEY

Nov. 16, 1954 W. G. PAIGE 2,694,362

HIGH-SPEED DOT PRINTER

Filed Aug. 25, 1951 15 Sheets-Sheet 8

INVENTOR.
W. GRIFFIN PAIGE

BY [signature]

ATTORNEY

INVENTOR.
W. GRIFFIN PAIGE

BY J. L. Sterling

ATTORNEY

INVENTOR.
W. GRIFFIN PAIGE
BY [signature]
ATTORNEY

Nov. 16, 1954 W. G. PAIGE 2,694,362

HIGH-SPEED DOT PRINTER

Filed Aug. 25, 1951 15 Sheets-Sheet 11

INVENTOR.
W. GRIFFIN PAIGE

BY J. L. Sterling

ATTORNEY

Nov. 16, 1954 W. G. PAIGE 2,694,362

HIGH-SPEED DOT PRINTER

Filed Aug. 25, 1951 15 Sheets-Sheet 12

INVENTOR.
W. GRIFFIN PAIGE

BY J. L. Sterling

ATTORNEY

INVENTOR.
W. GRIFFIN PAIGE
BY J. L. Sterling
ATTORNEY

INVENTOR.
W. GRIFFIN PAIGE
BY J. L. Sterling
ATTORNEY

Nov. 16, 1954 W. G. PAIGE 2,694,362

HIGH-SPEED DOT PRINTER

Filed Aug. 25, 1951 15 Sheets-Sheet 15

INVENTOR.
W. GRIFFIN PAIGE

BY J. L. Sterling

ATTORNEY

United States Patent Office

2,694,362

Patented Nov. 16, 1954

2,694,362

HIGH-SPEED DOT PRINTER

Walter Griffin Paige, Norwalk, Conn., assignor to Remington Rand Inc., New York, N. Y., a corporation of Delaware Application August 25, 1951, Serial No. 243,729

23 Claims. (Cl. 101—93)

This invention relates to high speed printing mechanisms of the type utilized in record controlled machines, such as tabulators, interpreters, addressing machines, and the like.

Printing mechanisms are known in which the outlines of the characters to be printed are formed by printing the appropriate dots of a dot grid which is of the same general size as the characters to be printed. Some machines of this type effect printing of the dots by passing electrical currents through minute areas of treated paper sheets. This sort of printing, however, is unsatisfactory because of the great expense of the treated paper. Other dot printing machines employ a character forming series of individually operable dot printing elements which are projected in combination simultaneously against an ink ribbon to effect printing of the whole character at once. This sort of machine is unsatisfactory in that the printing elements and their actuators are too bulky for machines adapted to print a series of whole characters side by side. Further, such machines are slow in operation due to the masses of moving parts therein.

The principal object of the invention is the provision of a mechanical dot printing mechanism which is operable at extremely high speed to print a series of characters side by side under control of electrical impulses.

Another object of the invention is to construct the printing mechanism in such a manner that printing is accomplished while the paper or other recording medium is in motion, thus making it unnecessary to provide otherwise idle time periods for starting and stopping the paper feeding means.

Another object of the invention is to construct the printing mechanism in such a manner that a minimum number of dot printing elements are provided, each being utilized to print any, or all, of a predetermined number of dots of the grid during the formation of a character.

A still further object of the invention is to provide automatic zero elimination means whereby zeros may be printed to the right of a significant digit or not as desired.

Other objects and structural details of the invention will be apparent from the following description when read in connection with the accompanying drawing, wherein Fig. 1 is a plan view of a one column model of the printing mechanism of the invention;

Fig. 11 is a chart illustrating the printing code, that is, it shows which dots of the grid are utilized for each character;

Fig. 12 is a chart illustrating the code utilized in the well known 80-column record card;

Fig. 13 is a diagrammatic view illustrating the dot printing representation of the letter M;

Fig. 14 is a diagrammatic view illustrating the dot grid of the invention;

Figs. 15–22 placed together, form a wiring diagram of the invention; and

Figure 23:
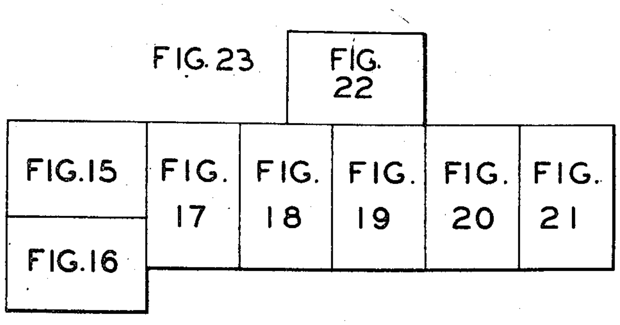

Fig. 23 is a diagram illustrating the manner in which Figs. 15–22 are to be positioned relatively to one another.

According to the invention, information contained in a tape or in a record card in the form of code perforations is printed on a continuously moving web of paper. Referring to Figs. 11, 13, and 14, the outlines of all of the digits and the letters of the alphabet are formed by printing selected ones of a grid of dots. Preferably, the said grid is made up of five vertical columns of seven dots apiece. The dots may be round or elliptical or any other shape, but preferably are square. As shown in Fig. 14 the dots are numbered 1–35, the succession beginning with the uppermost left hand dot and proceeding rightward in horizontal tiers. Figure 11 comprises a chart which illustrates the printing code, that is, the dots required for each of the letters and numerals. By way of illustrating the connection between the chart of Fig. 11 and the grid of Fig. 14 the dot printing representation of the letter M is shown in Fig. 13. As illustrated, this letter M is made up of those dots of the grid which are required to form the usual outline of the letter.

The means of the invention is equally well adapted for use with either the well known 80 or 90 column business machine controlling record cards. The code utilized in the 80 column card is indicated in Fig. 12. The card is provided with 80 columns, each including twelve perforation positions which are used singularly or in combination to represent all of the numerals and letters of the alphabet. The perforation positions 1–9 represent the numerals 1–9 when not combined with a hole in the 0, 11, or 12 positions which are utilized selectively to change the numerical representations to alphabetic representations.

It is required, therefore, that the code of the card be translated into the printing code of Fig. 11 before dot printing, according to the invention, can be accomplished. Any known means for sensing the card or record may be provided and circuit means, to be described hereinafter, for translating the sensed data into the printing code are provided. Before entering into a description of the translating means, however, it is deemed desirable first to describe the actual printing means.

The printing means of the invention is adapted to print a complete line of characters on each cycle of the machine, but for convenience of illustration and description, only one column of the means is shown and described. The device illustrated in the drawings is a one column printer for printing on a tape, and differs from each of the columns of a multicolumn machine only in details of framing and the like.

Figures 6, 7:
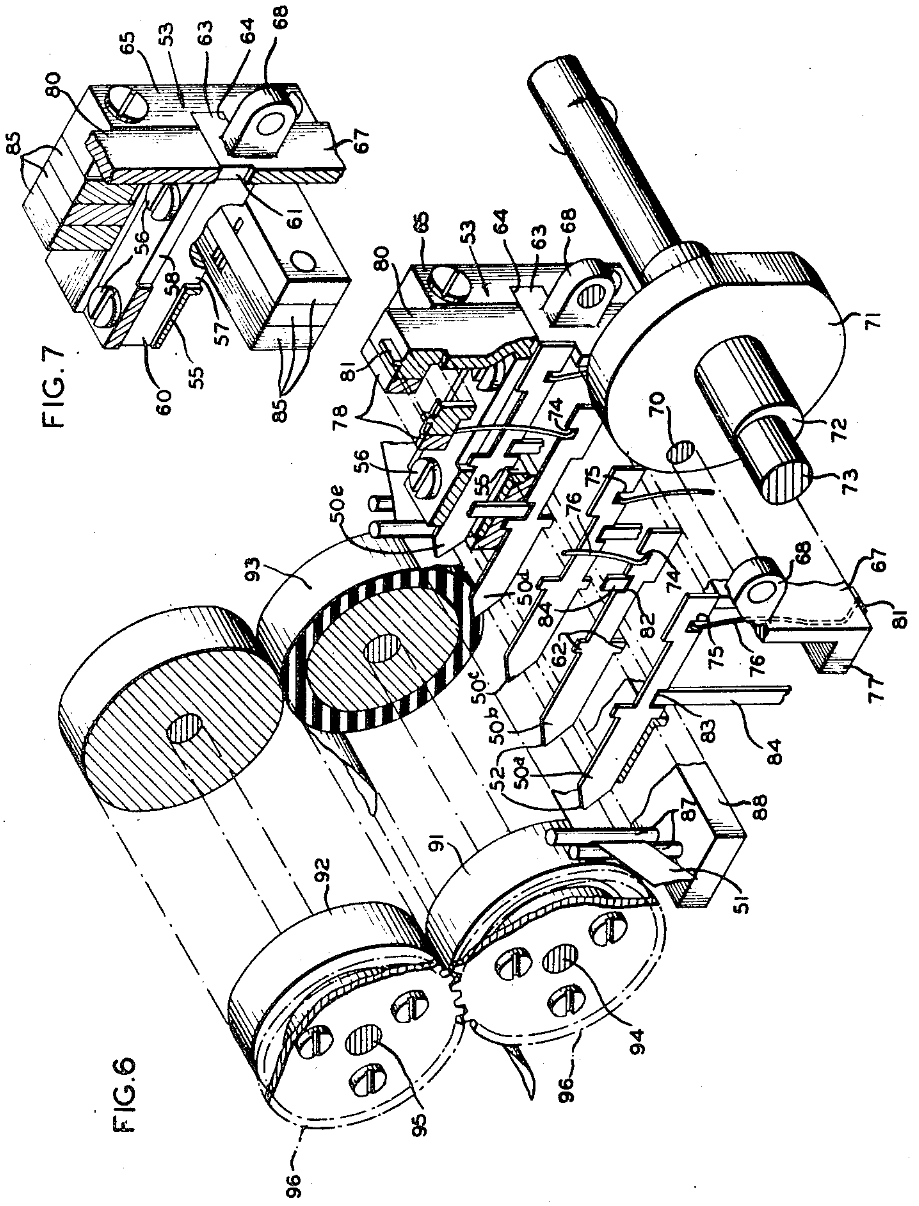
Fig. 6 is a fragmentary exploded isometric view of the printing elements and their operating and controlling mechanisms.
Fig. 7 is a fragmentary isometric view, partly in section, illustrating the framing of the printing element operating means.

Printing is accomplished by five sheet metal reeds 50 positioned side by side in close association. The five reeds represent the five vertical columns of dots in the grid of Fig. 14, and on each cycle of the machine, are pressed against an ink ribbon 51 up to a maximum of seven times to formulate any or all of the seven dots in each of said columns (Fig. 6).

Referring to Figs. 3, 4, 6 and 7 the reeds 50 are formed of light sheet metal or any other suitable material and each has a pointed front end 52 for printing the aforementioned square dots, and also a blunt rear end. All five reeds are carried side by side in a reciprocating reed carrier or frame 53 which consists of upper and lower frame members 54 and 55 secured together by bolts 56. Lower frame member 55 is provided with a centrally located front to rear vertical slot 57 which is aligned with a similar slot 58 in the upper member. Deep grooves 60 and 61 extend forwardly and rearwardly from slot 57 and are covered by the upper member 54. The reeds 50 are slidably mounted in the grooves 60 and 61 and have upper and lower projections 62 adapted to limit against the forward ends of the slots 57 and 58. It is to be noted, that in the full machine a plurality of sets of reeds 50 may be mounted in the grooves 60 and 61 with suitable spacers between adjacent sets.

Lower frame member 55 is somewhat wider laterally than the upper member 54 so that a shelf 63 is provided at either side of frame 53. The shelves 63 are slidably mounted in front to rear grooves 64 in guide blocks 65 secured to the side plates 66 of the machine. It is evident, therefore, that frame 53 is accurately guided for front and rear reciprocation. At its rearward end, lower frame member 55 is provided with a depending flange 67 from which a pair of ears 68 project rearwardly. Secured in the ears 68 and extending therebetween is a rod 70 which passes freely through a disc 71, near the periphery thereof. Disc 71 is journalled on an accentric portion 72 of a shaft 73 which is rotated ten times during each cycle of the machine as will be more fully described hereinafter. The construction thus far described is such that on each cycle of the machine, the reed carrying frame 53 is reciprocated forwardly and rearwardly ten times.

Near their rearward or blunt ends each reed 50 is provided with a notch 74 in its upper edge or a notch 75 in its lower edge, alternate reeds having like notches. Engaged in each notch 74 and 75 is the free end of a spring wire 76 which tends to maintain the projections 62 of the associated reed against the forward ends of the slots 57 and 58. From the notches 74 and 75 the spring wires extend upwardly and downwardly, respectively, those extending downwardly being clamped to a forward extension of flange 67 by a bar 77, and those extending upwardly being clamped by a similar bar 78 to the forward extension of an upstanding flange 80 of the upper frame member 54. As shown, flange 80 is substantially an inverted duplicate of flange 67. The ends of the spring wires 76 extend beyond the clamping bars 77 and 78 and project through suitable holes in a ridge 81 prolonged vertically from flange 67 or flange 80.

Each reed 50 is also provided with a notch 82 in its upper edge or a notch 83 in its lower edge, alternate reeds having like notches. The upper notches 82 are engaged by depending stops 84 which are rigidly guided in suitable slots in a cross bar 85 which is secured to upward extensions of the guide blocks 65. The lower notches 83 are engaged by upstanding stops 84 also rigidly guided in a cross bar 85 which is secured to lower extensions of the guide blocks 65. Preferably, the stops 84 and their notches are in staggered front and rear relation, and preferably, the cross bars 85 are made up, each, of three bars of which the outer two have grooves in their inner faces to accommodate the stops. Normally the stops 84 are engaged in the notches 82 and 83.

The construction is such that normally the stops 84 prevent the reeds 50 from reciprocating forwardly and rearwardly with the carrier frame 53. However, if the stops 84 are disengaged from the notches 82 and 83, the springs 76 force the reeds to reciprocate as one with the frame.

Any desired means may be provided for releasing the stops 84 selectively, but, preferably each stop is connected to the spring urged armature of an electromagnet 86 in such manner that energization of the latter frees the stop. Circuit means for energizing the magnets 86 selectively will be described hereinafter.

When a reed 50 is projected forward by eccentric 72 and spring 76, it strikes against the ink ribbon 51 which is guided between posts 87 projecting upward from a cross-bar 88. Either end of ribbon 51 is wound on a spool 90 which may be rotated in a manner to be described hereinafter. Immediately behind ribbon 51 there is located a platen roll 91 with which a pressure roller 92 cooperates. Paper, in the present instance in the form of a tape 93, is fed by cooperative action of platen roller 91 and pressure roller 92, from a spool 93 past the ribbon 51. The projection of a reed 50 against ribbon 51 prints a dot on the tape 93 as the latter is fed between the former and the platen.

Figure 1:
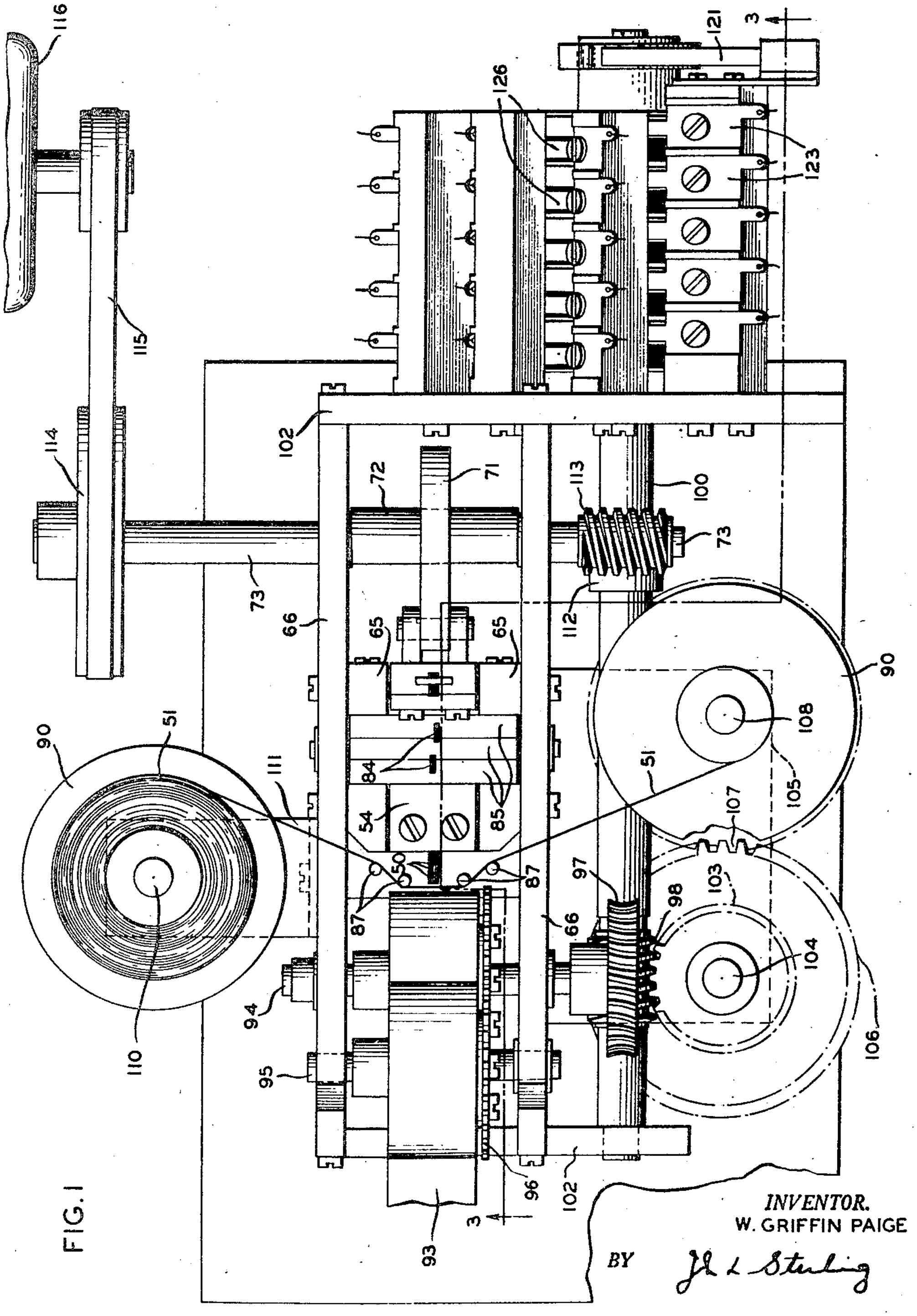
Figure 2:
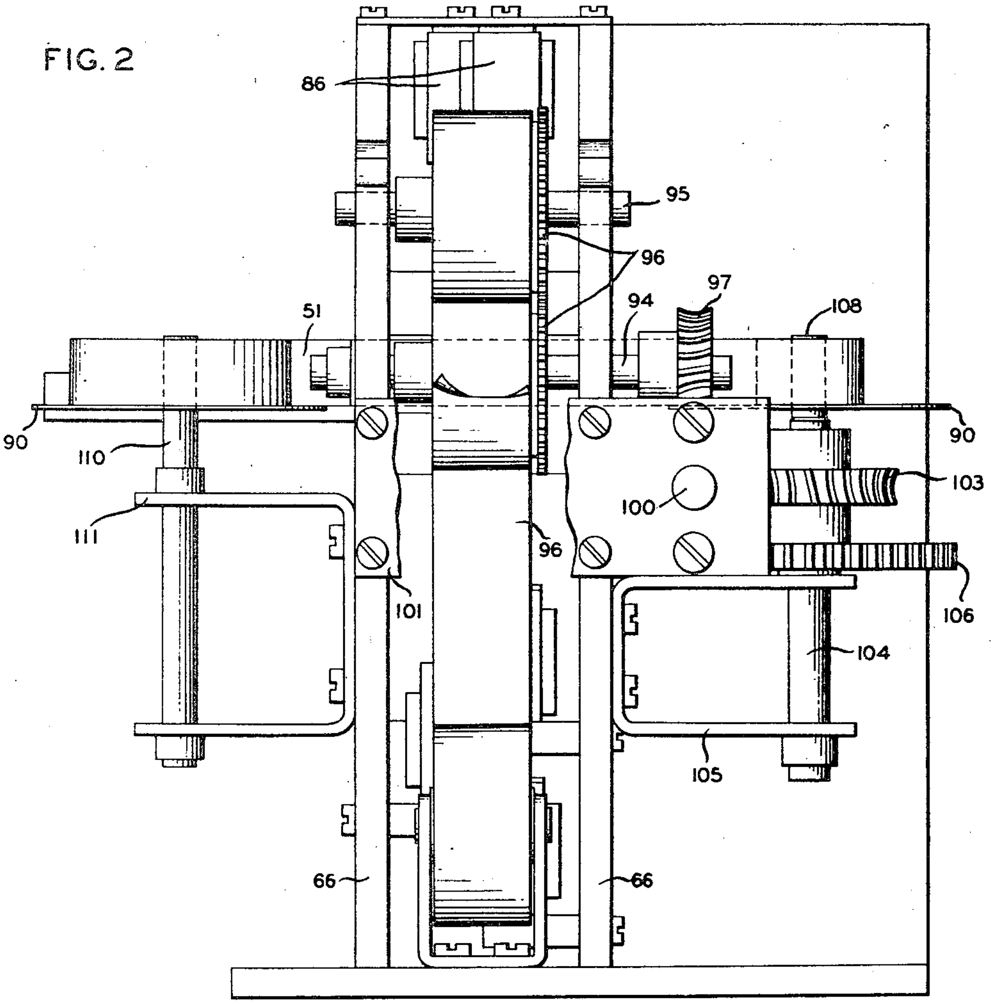
Fig. 2 is a rear view of the mechanism shown in Fig. 1 with a certain frame bar broken away to show the interior construction.
Figure 4:
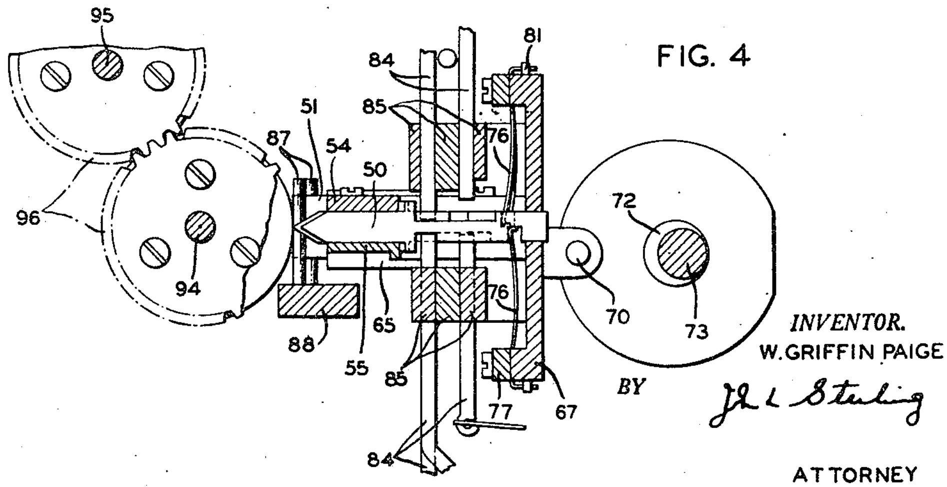
Fig. 4 is a fragmentary sectional view similar to a portion of Fig. 3 but illustrating an operated position of the parts.
Figure 3:
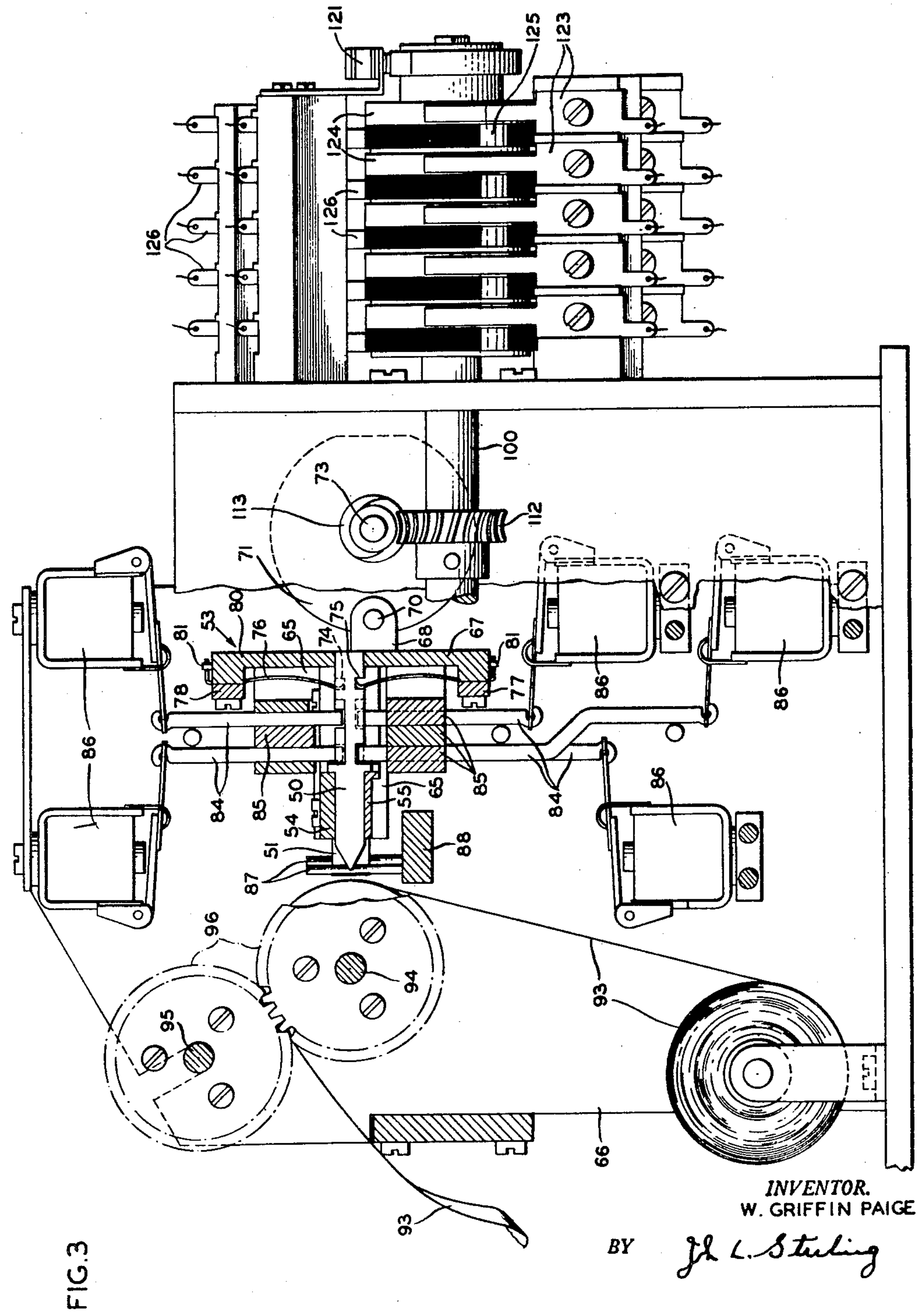
Fig. 3 is a sectional view of the device on line 3—3 of Fig. 1.
Figure 5:
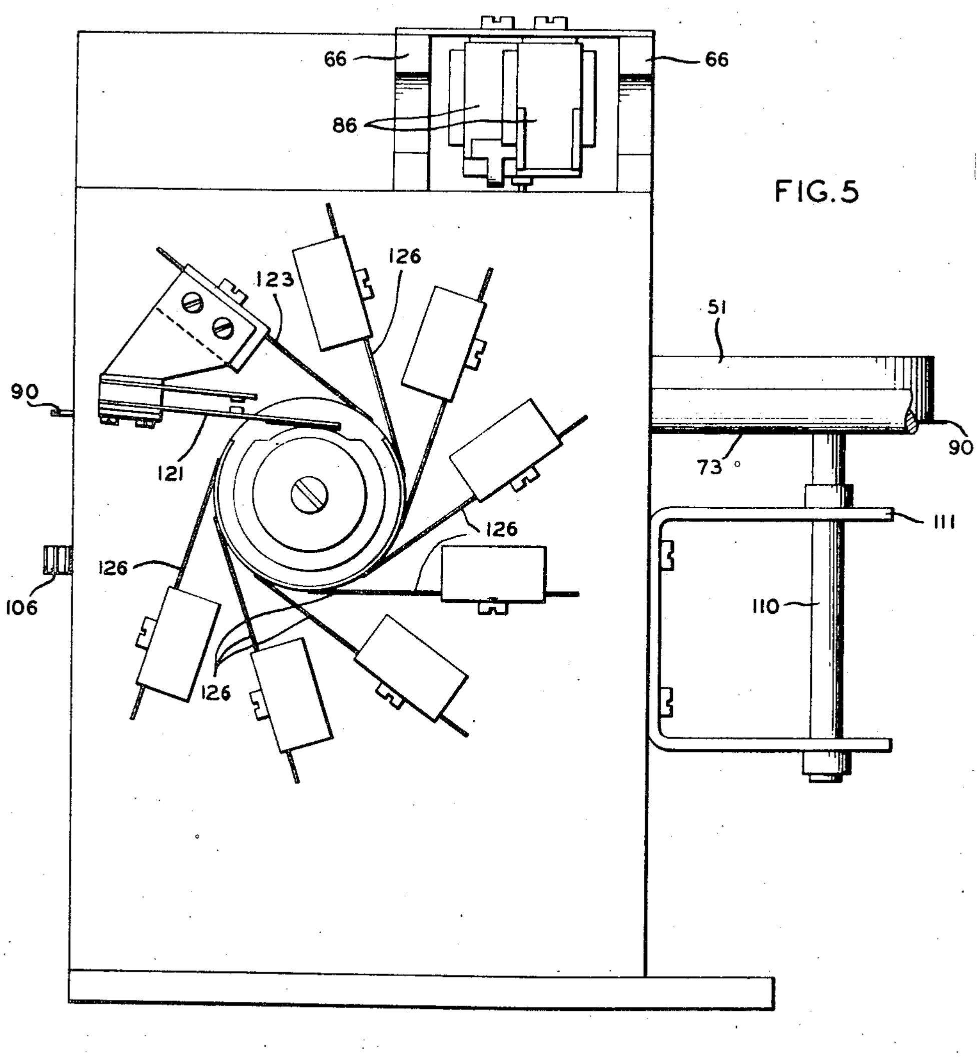
Fig. 5 is a view in front elevation of the device.

Platen 91 is mounted on a shaft 94 journalled in side plates 66, and pressure roller 92 is fixed on a shaft 95 adjustably journalled in said side plates (Figs. 1, 2 and 3).

Shafts 94 and 95 are connected for rotation at the same speed by gears 96 and the shaft 94 is provided at one end with a worm wheel 97 which is driven by a worm 98 on a shaft 100. Shaft 100 is journalled in rightward extensions of the front and rear frame plates 101 and 102 which are bolted to the side plates 66. Worm 98 is also engaged by a worm wheel 103 on a vertical shaft 104 journalled in a bracket 105 secured to the right hand side plate 66. A second gear 106 on shaft 104 meshes with a gear 107 fixed on the vertical spindle 108 of the right hand ribbon spool 90. The left hand spool 90 is mounted on an upright spindle 110 supported in a bracket 111 bolted to left hand side piece 66. Thus ribbon 51 is fed positively in one direction only, the spools 90 being interchanged when the ribbon supply of the left hand one becomes exhausted.

Shaft 100 has thereon a worm wheel 112 which is driven by a worm 113 on an end of the shaft 73 which between the side plates 66 carries the eccentric portion 72 previously referred to. Shaft 73 extends beyond the left hand side plate 66 and has fixed thereon a pulley 114 which is engaged by a belt 115 driven by an electric motor 116.

According to the invention, a cycle of the machine is measured by one rotation of shaft 100 or ten rotations of shaft 73, and the ratio of the gears connecting said shafts is selected accordingly. The gearing interconnecting platen shaft 94 and shaft 100 is such that during one rotation of the latter, the paper tape 93 will be fed a distance equal to ten dot spaces of the grid of Fig. 14. Thus the tape is fed in time with the reciprocations of the reeds 50 so that any or all of the seven dots in each of the five vertical columns of the grid, Fig. 14, are printed in their appropriate relative positions. The last three reciprocations of the reeds during each cycle are idle ones during which the paper is fed three dot spaces to provide a vertical spacing between printed characters. Of course, more or less vertical space between characters may be provided if desired.

The driving means just above described is extremely simple and only by way of example. According to the invention any appropriate driving train may be provided.

The means for energizing the magnets 86 selectively to free the reeds 50 will now be described. For convenience, the five reeds and their associated magnets 86 are given the suffix *a*, *b*, *c*, *d* and *e* (Fig. 6), the left hand reed being 50*a*, the next 50*b*, etc. Thus, reed 50*a* is utilized for printing dots 1, 6, 11, 16, 21, 26 and 31 of the grid shown in Fig. 14 and reed 50*e* is utilized for printing dots 5, 10, 15, 20, 25, 30 and 35 of said grid.

The magnets 86 are connected by a common line 120 (Figs. 15–22) through the cam actuated switch 121 with a positive supply lead 122. Each magnet 86 is also connected with a brush 123 which engages a slip ring 124 mounted on an insulated drum secured to an extension of shaft 100. Associated with each slip ring 124 is a single commutator segment 125 which engages brushes 126 as shaft 100 rotates. There are seven brushes 126, one for each dot position in a vertical column of the grid of Fig. 14, and all seven are arranged in equi-spaced relation around seven tenths of the periphery of shaft 100. With this arrangement, each segment 125 engages in succession all seven of the associated brushes 126 during seven tenths of a machine cycle as measured by a rotation of shaft 100.

The brushes 126 serve to connect the magnets 86 with the negative supply line 127 through a net-work presently to be described so that as the shaft 100 rotates the magnets 86*a–e* are energized selectively up to a maximum of seven times each. This effects the freeing of the reeds 50*a–e* to print any or all of the dots of the grid of Fig. 14. Each brush 126, therefore, represents one of the dots 1–35 of said grid and is labelled accordingly, for example, $126^1$, $126^2$, $126^3$, etc.

Each brush 126 is connected by a plurality of leads 128 with an equal number of character conductors 130. A rectifier 131, preferably of the germanium crystal type, is inserted between each lead 128 and the character conductor 130 with which it is associated. There is at least one conductor 130 for each alphabetic and numeric character to be printed, but each said conductor is not directly connected by leads 128 with all of the brushes 126 required to form the character which it represents. Rather, conductors 130 associated with letters or numerals having similar outlines are interconnected by bridging conductors 132 (Fig. 21) in some of which rectifiers 129 are inserted to eliminate back circuits. This bridging substantially reduces the required number of rectifiers 131 and a concrete example thereof will be described hereinafter.

The wiring diagram illustrated in Figs. 15–21 is utilized for printing information in accordance with the perforation patterns contained in 80-column cards. As mentioned above, each column of a said card includes twelve perforation positions of which the lowermost nine represent the digits 1–9 when utilized singly, and the several letters of the alphabet, when utilized in conjunction with one of the top three positions which are designated, from top to bottom, as the 12, 11 and 0 positions.

According to the invention a relay 135 (Figs. 15 and 16) is provided for each perforation position 1–9 and a relay 136 for each position 12, 11 and 0. Each relay 135 has associated therewith four pairs of normally open contacts 137 which are closed on energization thereof. One pair of contacts of each group is associated with a digit and the other three with the alphabetic characters whose card code includes the perforation position assigned to that digit. The character conductors 130 are connected to the associated contacts 137 and in those instances wherein two such conductors are provided for a character to facilitate the aforementioned bridging, one has a rectifier 138 inserted between it and the associated contact. One member of each digital contact pair is normally closed with a third contact 140 which is connected by a lead 141 with the common member of the next higher digital pair. The common member of the contacts 137, 140 associated with the digit one, is connected through a lead 142, normally closed contacts 143 associated with the zero relay 136, lead 144, normally closed contacts 145 of the eleven relay 136, lead 146, normally closed contacts 147 of the twelve relay 136, and lead 148 to the negative supply line 127.

The construction thus far described is such that if a relay 135 is energized to print a digit, the character conductor or conductors associated with the digit is connected to the negative supply line 127 through normally closed contacts associated with each lower digit and also with the 12, 11 and 0 control perforation positions. Thus, for example, the energization of the "5" relay 135 is effective to print a "5" only if the "1"–"4" relays 135 and the 12, 11 and 0 relays 136 are not energized. This arrangement effectively prevents the printing of a digit when an alphabetic character is called for, and also prevents simultaneous printing of two or more digits when one or more relays 135 are energized inadvertently.

The alphabetic contacts 137 associated with each relay 135 are connected by leads 150, each with one of three conductors 151, 152 and 153. Conductor 151 is connected by a lead 154 with an extension 155 of the negative supply 127 through a normally open contact 156 associated with the "12" relay 136. All of those contacts 137 which are associated with letters whose code includes a hole in the 12 position are connected to the conductor 151. Conductor 152 is connected by a lead 157 with the negative line 155 through a normally open contact 158 associated with the "11" relay 136. All contacts 137 associated with letters whose code includes a hole in the "11" position are connected to the conductor 152. Conductor 153 is connected by a lead 160 with the negative line 155 through a normally open contact 161 associated with the "0" relay 156. All contacts 137 associated with letters whose codes include the "0" perforation are connected to the conductor 153.

The construction is such that if, for example, the "5" relay 135 and the "12" relay 136 are energized to effect printing of the letter E, the conductors 130 associated with said letter are connected to negative supply through the appropriate contact 137 and the contact 156, said contacts being closed on energization of the "5" and "12" relays. This, as described above, effects energization of the appropriate relays 86 at the appropriate times and a dot representation of the letter "E" is printed.

All of the relays 135 and 136 are connected with the positive supply line 122 by a common conductor 163 having suitable branches. The relays 135 and 136 are connected to the negative supply 127 through individual leads 164 and a card sensing unit 165 or keyboard. Sensing unit 165 may be of any known type adapted to connect the leads 164 with the negative supply 127 selectively, in accordance with the perforations in a card. As here shown, the sensing unit consists merely of twelve contact members 166 which connect extensions 167 of the negative supply with the leads 164, when holes are sensed.

The construction is such that when a card is sensed, a negative return is provided for each relay 135 and 136 for which a hole is present in the card. This energizes the affected relays and a negative return is provided for the associated character conductor or conductors 130.

The operation of the device with regard to the printing of any letter or numeral is illustrated diagrammatically in Fig. 11 and a sample operation with regard to the printing of the letter "M" will now be described. Referring to Figs. 15–21, and 11–14, it will be seen that the card code for the letter M includes the "4" hole and the "11" hole and that the printing code includes the dots 1—5—6—7—9—10—11—13—15—16—18—20—21—25—26—30—31 and 35. The sensing of the "4" and "11" holes of the card column by the appropriate contact members 166 provides negative returns through leads 164 for the "4" relay 135 and the "11" relay 136 and said relays are energized. Energization of the "11" relay opens the contact 145 which interrupts the negative return for the "4" contact 135. Contact 158 of said relay, however, is closed, providing a negative return for the "M" contact 137 through lead 150, conductor 152 and lead 157. Two character conductors 130 are provided for the letter M and the closure of their associated contact 137 connects them to the negative supply. One of the "M" conductors 130 is connected by rectifiers 131 and leads 128 with the brushes $126^{7}$, $126^{13}$, $126^{18}$ and $126^{9}$. This "M" conductor 130 also is bridged with the "W" conductor 130 through a lead 132 and a rectifier 129, the latter being so positioned as to permit of a negative return for the "W" conductor through the "M" conductor. The "W" conductor 130 is connected by leads 128 and rectifiers 131 with brushes $126^{1}$, $126^{6}$, $126^{11}$, $126^{16}$, $126^{21}$, $126^{26}$, and $126^{31}$. The other "M" conductor 138 is connected by leads 128 and rectifiers 131 with brushes $126^{5}$, $126^{10}$, $126^{15}$, $126^{20}$, $126^{25}$, $126^{30}$ and $126^{35}$. This "M" conductor 130 does not provide a negative return for any other conductor 130 through the bridging network 129, 132.

It will be seen, therefore, that a negative return is provided through the "M" contacts 137 for all of the brushes 126 utilized in printing the letter "M." During the first tenth of a cycle of shaft 100, the brushes $126^{1}$ and $126^{5}$ are contacted by the appropriate commutator segments 125 and the magnets **86*a* and 86*e* are energized. Energization of these magnets at this time frees the reeds 50*a* and 50*e* to print dots 1 and 5 as described above. During the second tenth cycle of shaft 100 the brushes $126^{6}$, $126^{7}$, $126^{9}$ and $126^{10}$ are contacted by the associated segments 125 and relays 86*a*, 86*b*, 86*d* and 86*e* are energized. This results in the printing of the dots 6, 7, 9 and 10. Further rotation of shaft 100 results in the printing of the other dots required for the letter M as shown in Fig. 13. The entire letter is printed during seven-tenths of a rotation of shaft 100, the remaining three-tenths of a cycle being utilized merely to feed the tape 93 three dot spaces so that a definite "between lines" spacing is provided. Preferably the cam actuated contacts or switch 121 are opened for the final three-tenths of a cycle in order to open the positive supply line while a new card is being sensed in the unit 165** (Fig. 15), and it is believed evident that the device operates in the same manner to print the other letters and numerals.

Figure 15:
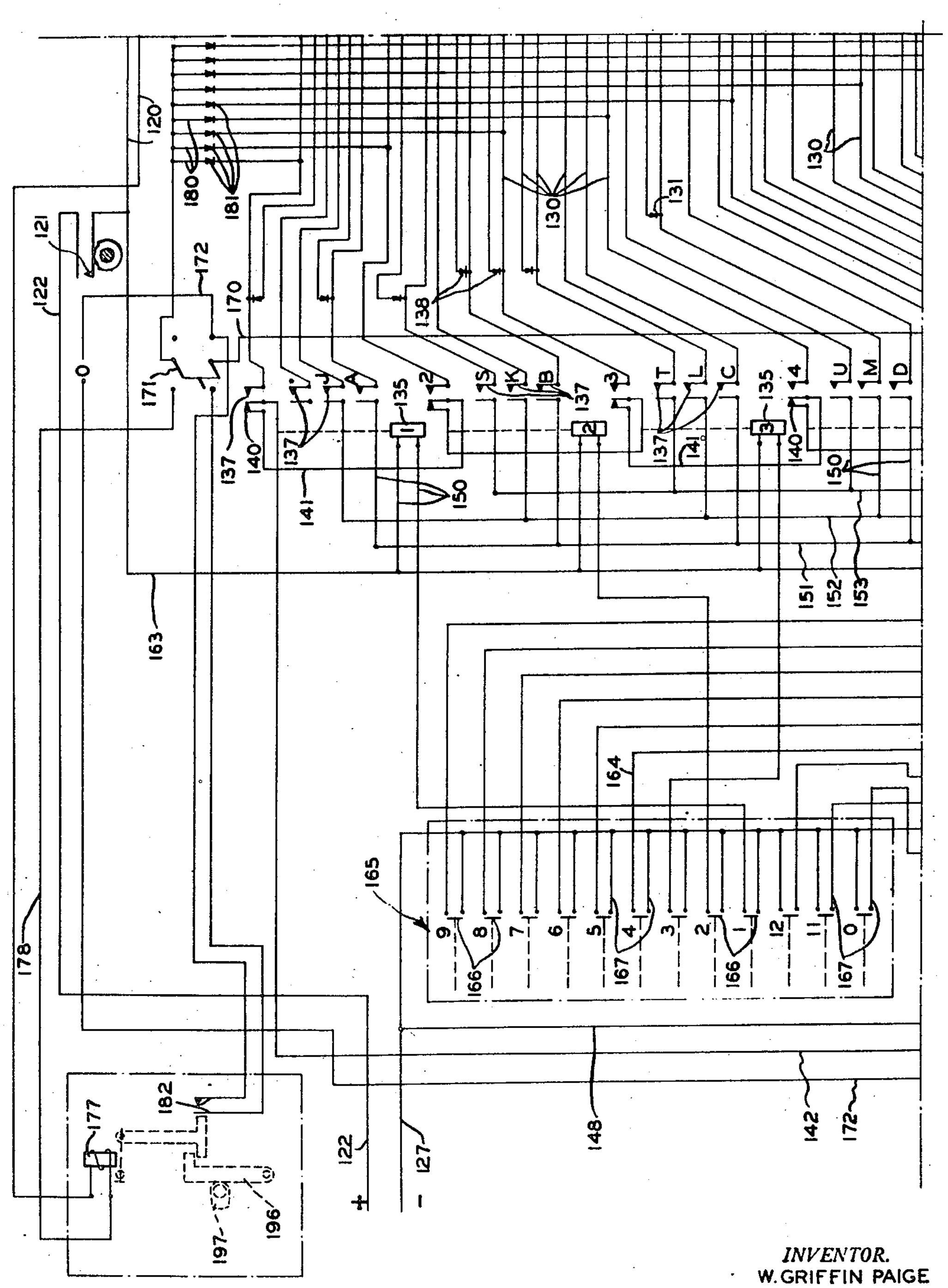

Referring to Fig. 15, one of the contacts 137 associated with the "1" relay 135 is not connected in any way to negative supply. However, conductor 130 is connected to these contacts and by leads 128 and rectifiers 131 to brushes $126^{27}$, $126^{28}$, $126^{32}$, $126^{33}$. This combination of dots would, if printed, represent a period or a decimal point. In those instances in which periods or decimal points are desired, this pair of contacts 137 is connected with the negative line 127 through any suitable control medium. For example, the contacts may be connected with lead 153 which is bridged to the negative line when the zero relay 136 is energized. Thus, a period could be printed if sensing unit 165 sensed the 0–1 perforation combination, which, as shown in Fig. 12, is not utilized for the alphabetic and numeric characters.

According to the invention, all zeroes punched in a card may be printed, or, zeroes may be printed only in those columns to the right of one in which a digit 1–9 is printed. This latter operation is effected by an automatic zero elimination device.

Figure 16:
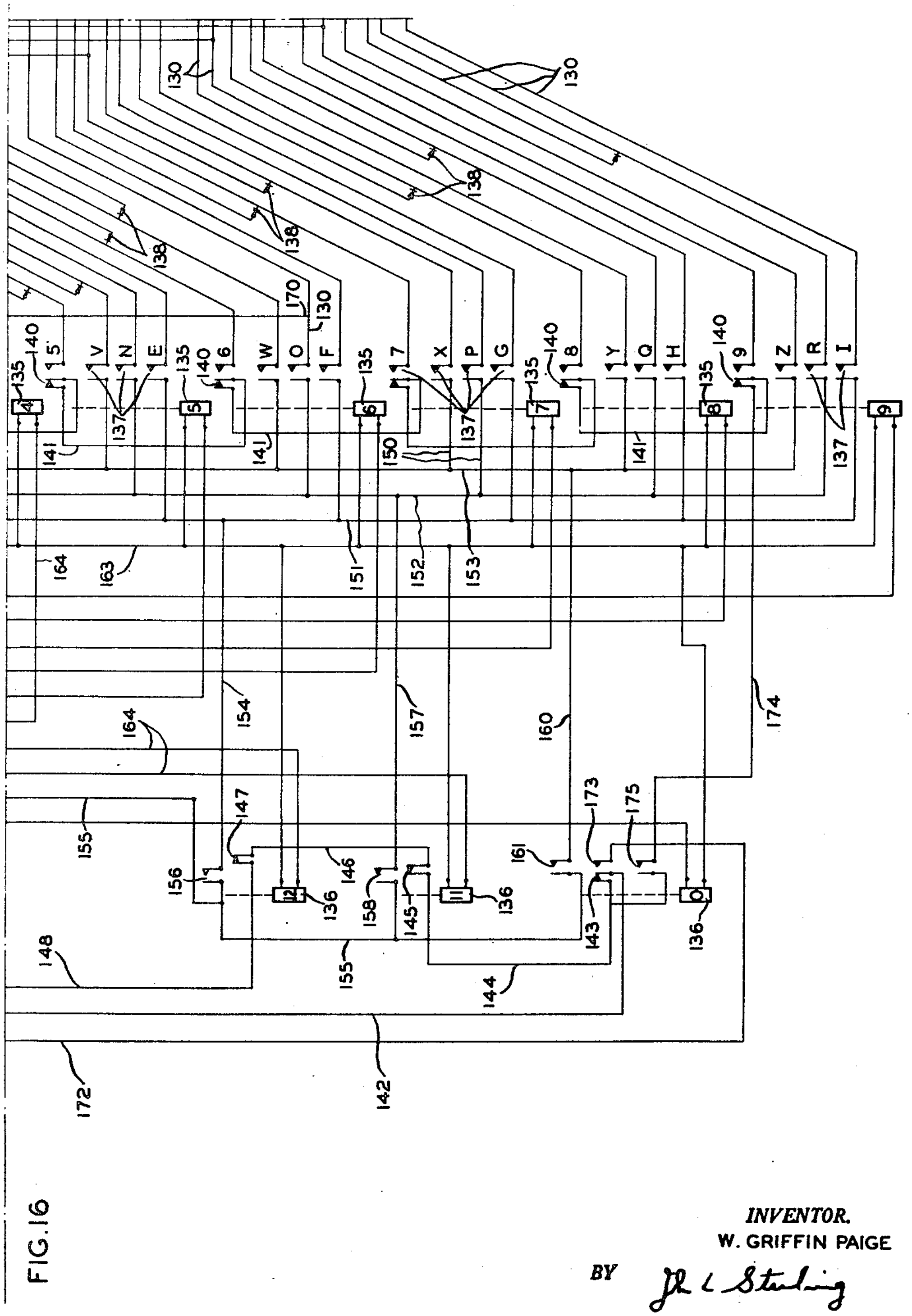
Figure 17:
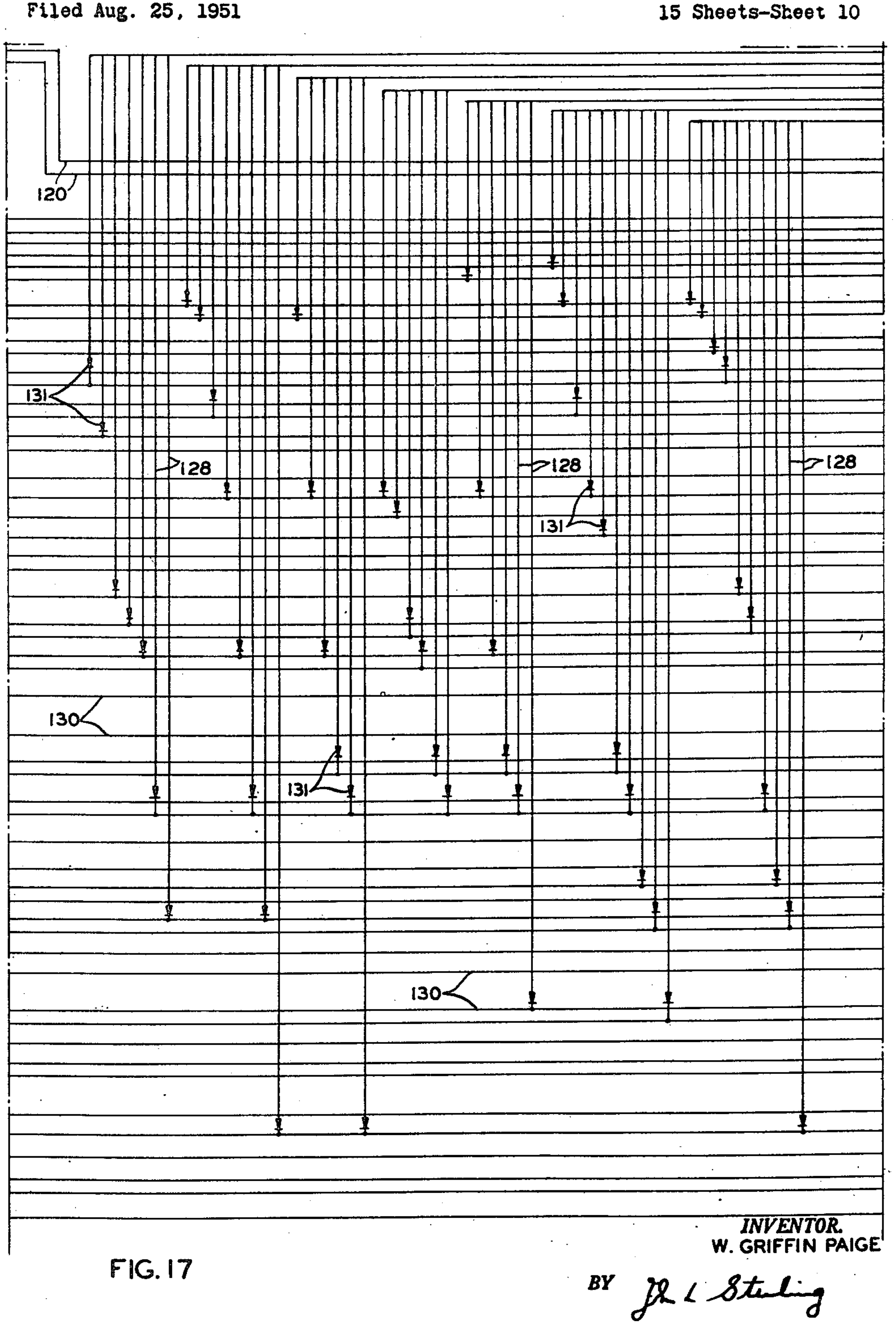
Figure 18:
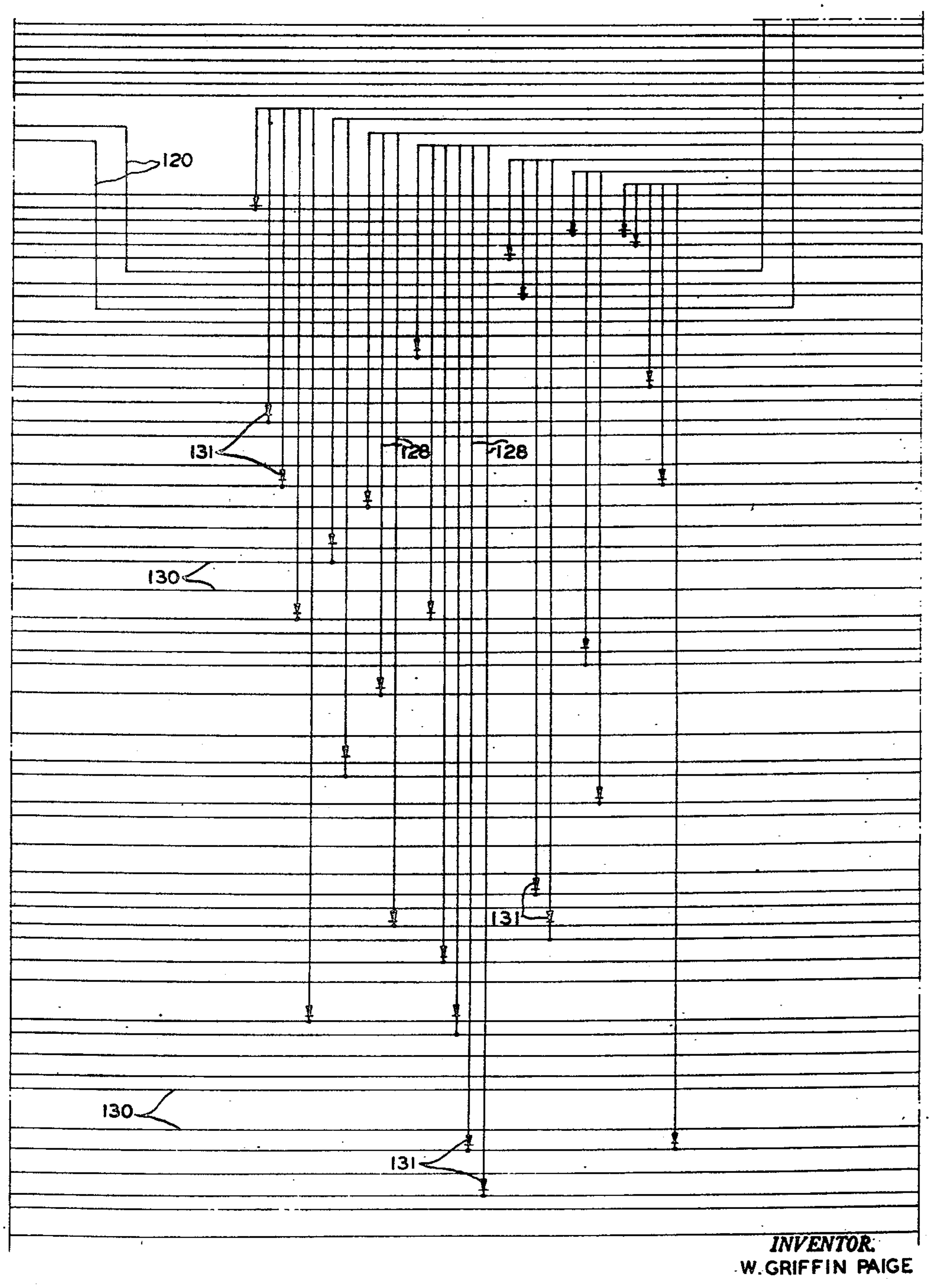
Figure 19:
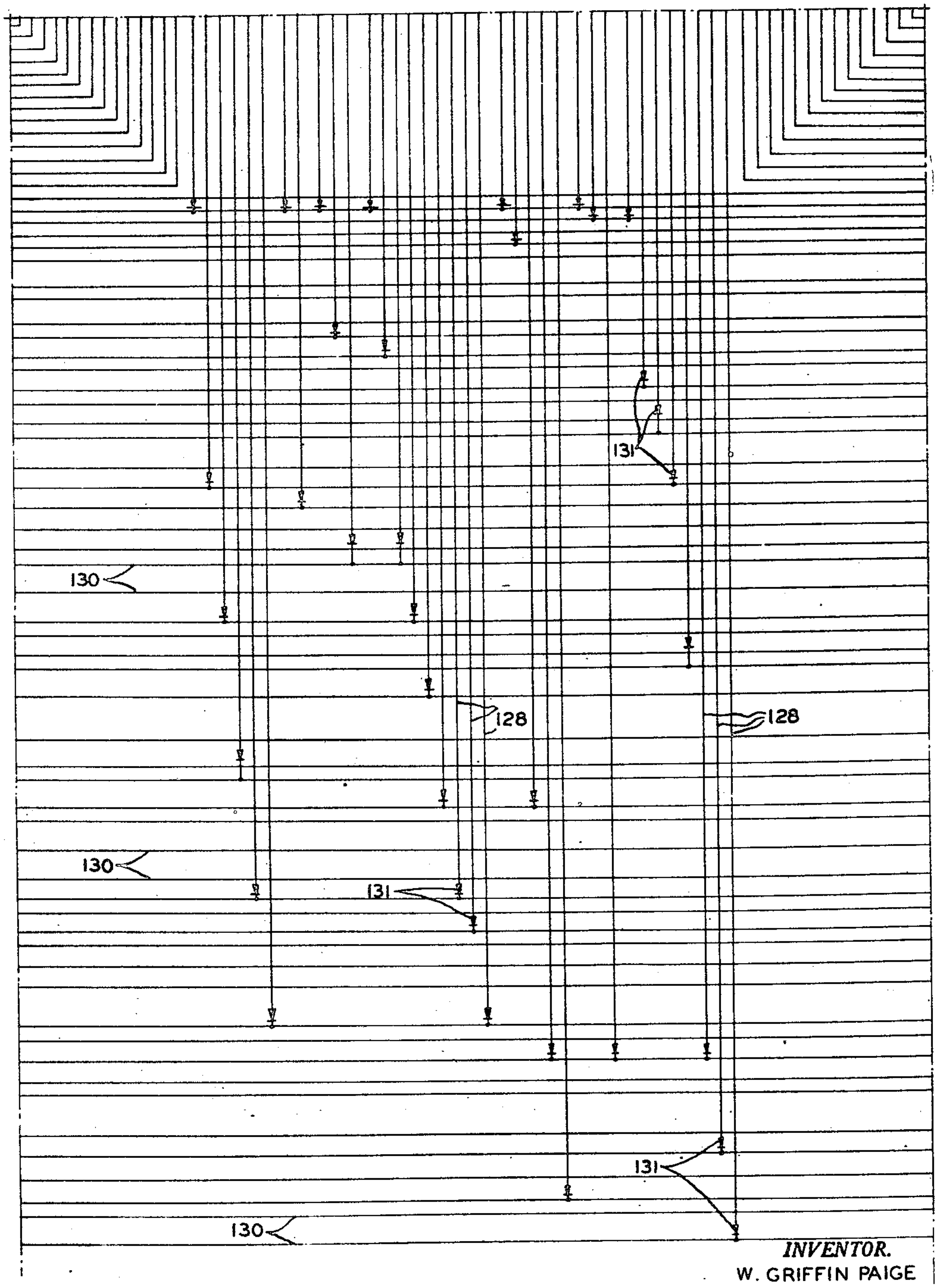
Figure 20:
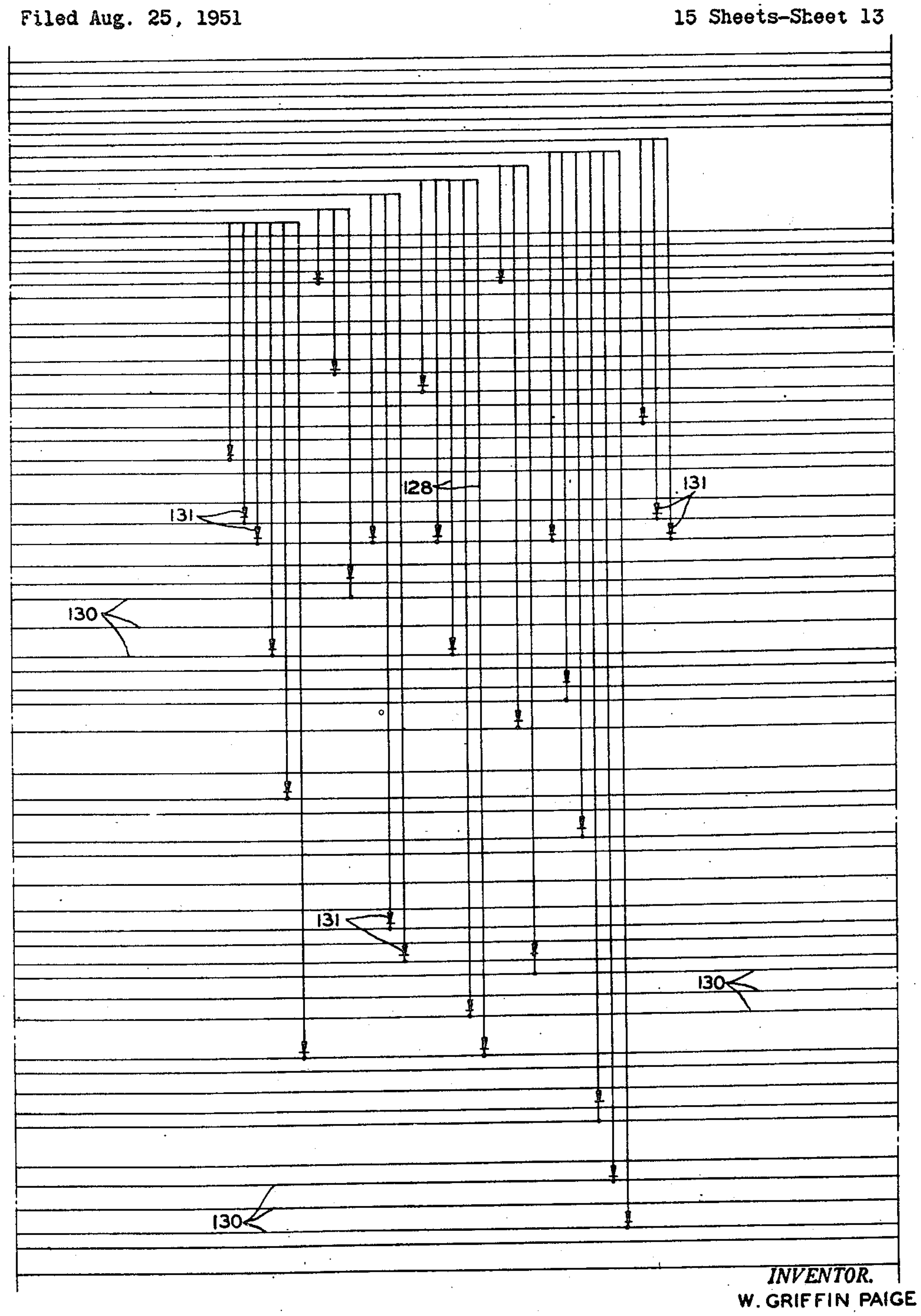
Figure 21:
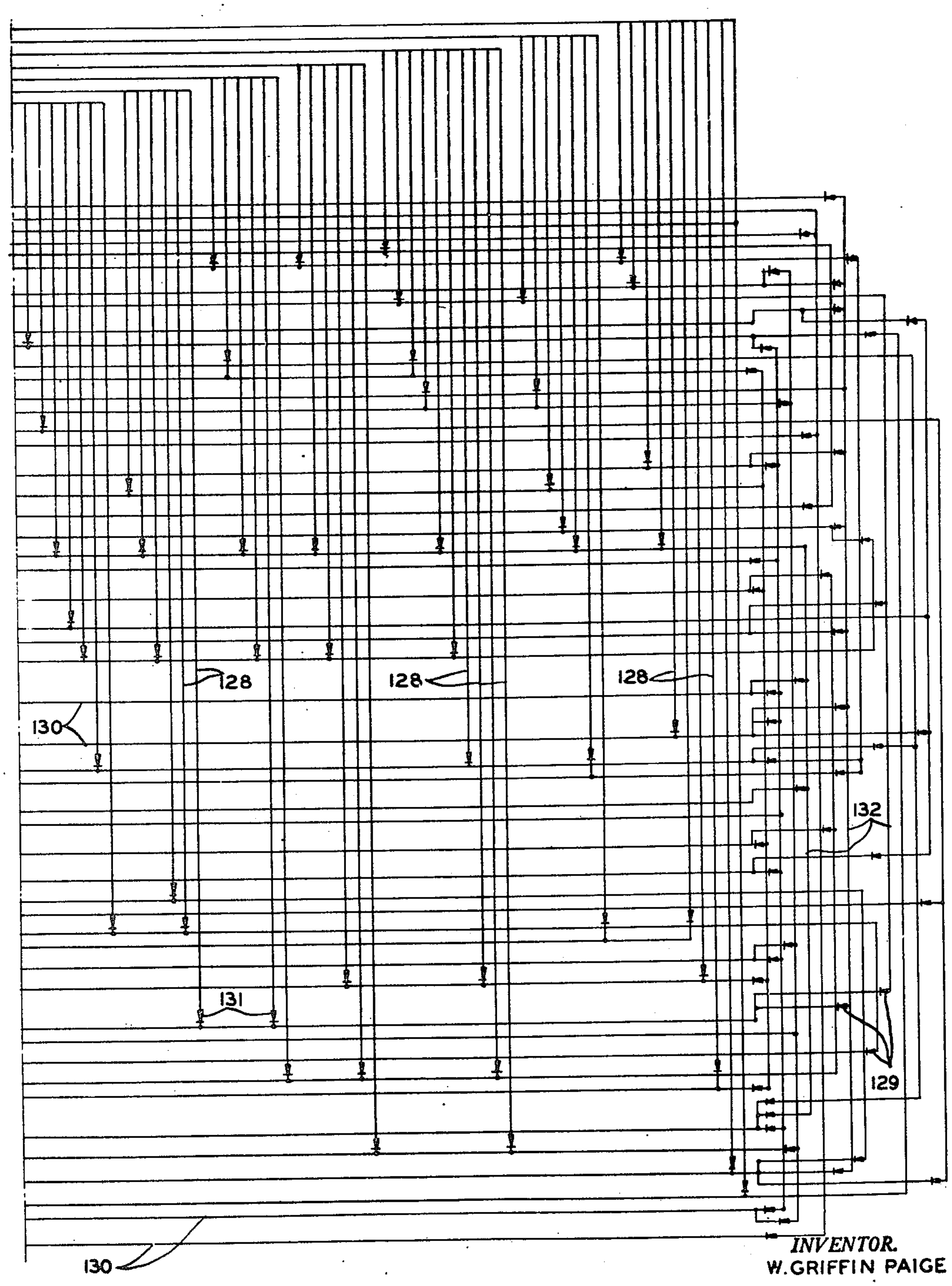
Figure 22:
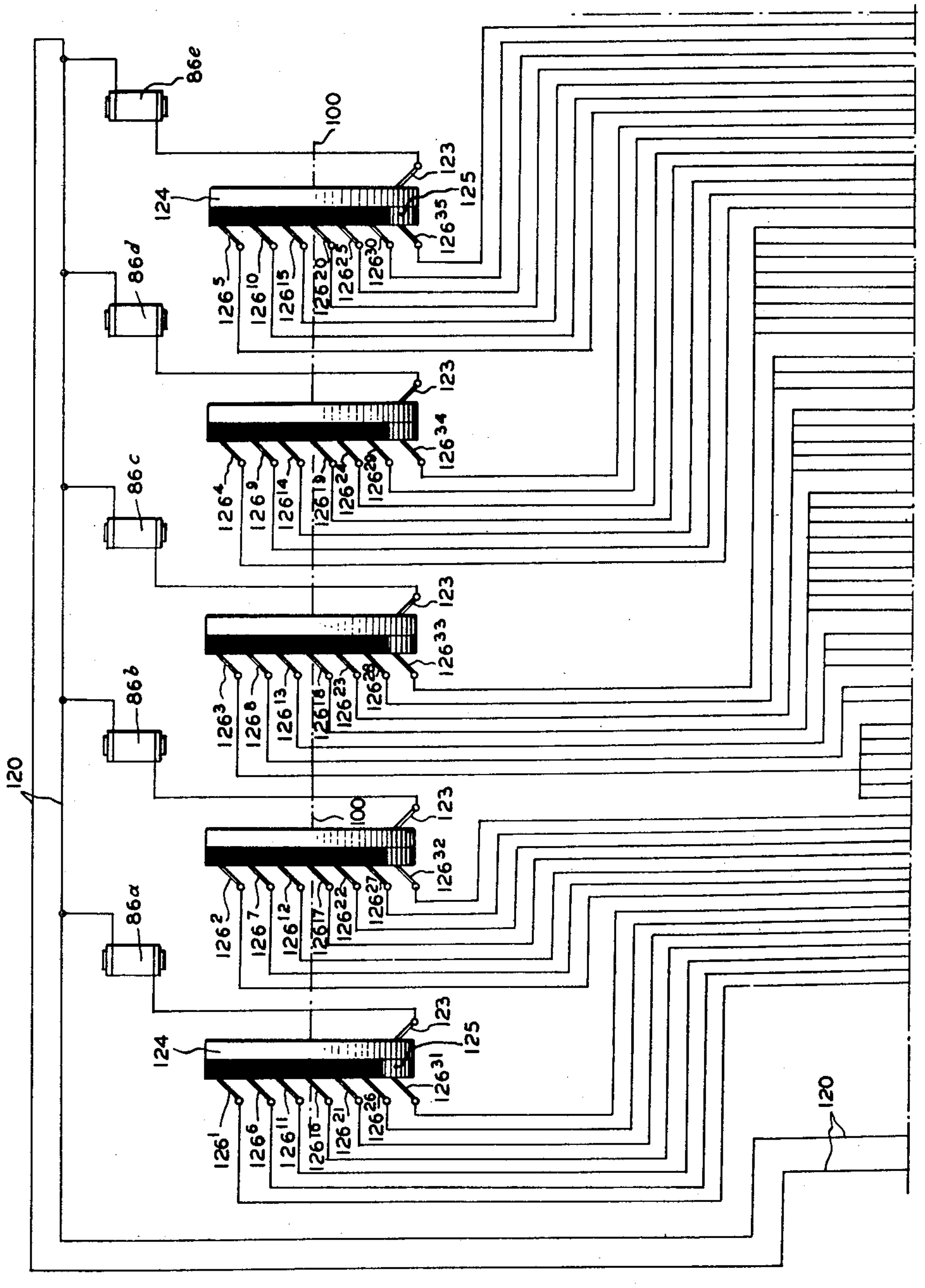

Referring to Figs. 15 and 16, the letter "O" conductor 130 is connected by a lead 170 with one side terminal of a double pole double throw switch 171. In one position of the switch, lead 170 is connected thereby with a lead 172 which extends to a contact 173 which is normally separated from one member of the normally closed contacts 143 described above. When the zero relay 136 is energized a negative return for the letter "O" conductor 130 is provided through contacts 173, 143, lead 142, the 1–9 contacts 140, 137, and leads 141, a lead 174, contacts 175, which are closed on energization of the zero relay, lead 144, contact 145, lead 146, contact 147 and lead 148.

It will be seen, therefore, that the letter O conductor 130 is utilized not only for printing said letter but also for printing the numeral 0. It will also be seen that the zero printing circuit is opened, whenever any of the relays 135 or the "12" or "11" relays 136 are energized.

The automatic zero elimination mechanism includes a magnet 177 (Fig. 15) connected by a lead 178 with one end terminal of the switch 171 and by lead 120 to the positive supply. In the position of switch 171 in which lead 170 is connected with lead 172, the lead 178 for magnet 177 is opened, but in the opposite setting of said switch, said lead 178 is connected with a series of leads 180. There is one lead 180 for each digit 1–9 and each is connected through a rectifier 181 with one of the digit conductors 130 associated with the next printing column to the left. Thus, the energization of a magnet 135 to print a digit in a given column provides a negative return through switch 171 and the appropriate lead 180 for the magnet 177 in the next column to the right. Therefore, whenever a digit is printed in a given column, the magnet 177 in the next column to the right is energized.

As mentioned above, the setting of the switch 171, which connects leads 178 and 180 disconnects the leads 170 and 172 so that printing of a zero under control of a zero perforation in the card in the manner described above is prohibited. Leads 170 and 172, however, are also connectable by a pair of normally opened contacts 182 which may be closed or not, as desired, by a special control mechanism presently to be described.

The construction thus far described is such that when switch 171 is set in one position, zeroes punched in a card are always printed, and when switch 171 is set in the opposite manner, punched zeroes may or may not be printed, depending on whether the contacts 182 are closed or not.

Figure 9:
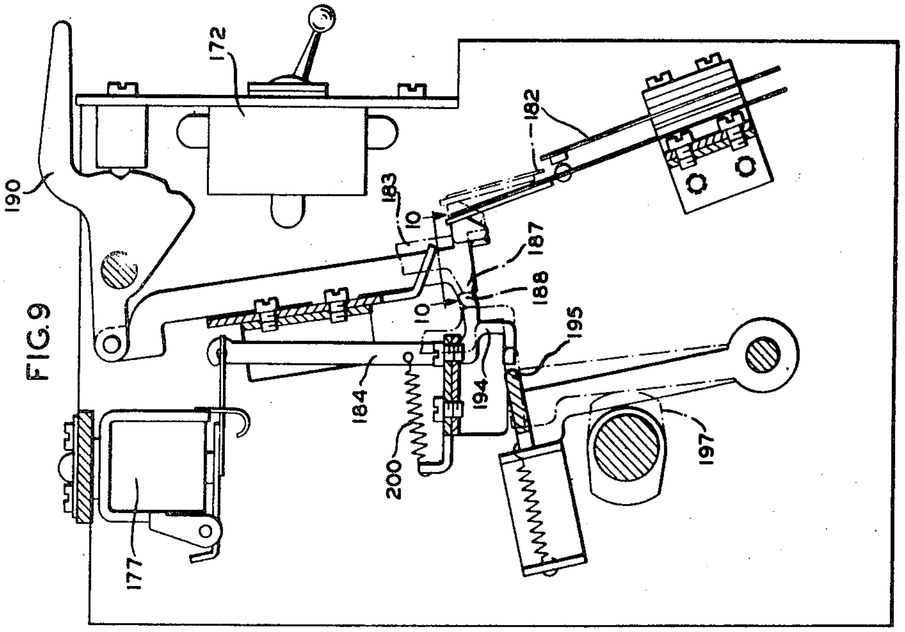
Fig. 9 is a view similar to Fig. 8 but shows the parts of the unit in operated positions.
Figures 8, 10:
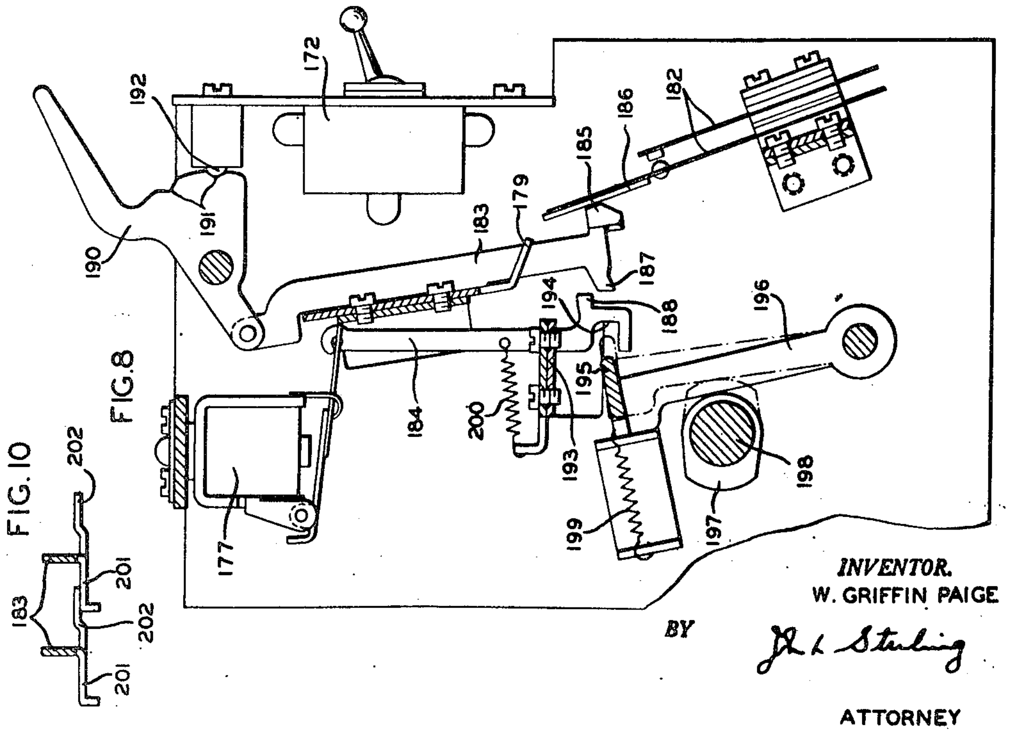
Fig. 8 is a sectional view of a zero elimination control unit which is associated with the means shown in Figs. 1–7.
Fig. 10 is a fragmentary sectional view taken on line 10—10 of Fig. 9.

The means for closing the contacts 182 are shown in Figs. 8, 9 and 10 and include, in each column, a hand settable interponent 183 and an interponent 184 controlled by the magnet 177 of the next column to the left. Interponent 183 is guided in a suitable comb plate 179 and has a nose 185 for engaging an insulated pad 186 secured to one of the members of the contact pair 182. Interponent 183 is also provided with a nose 187 adapted to be engaged by a nose 188 on the interponent 184. At its upper end, interponent 183 is pivotally connected to the rearward arm of a hand settable lever 190, said lever having in one edge thereof a pair of notches 191 adapted to be engaged by a settable detent 192 to maintain the lever and the interponent in either of two set positions. The lower or inactive position of interponent 183 is illustrated in Fig. 8 wherein it will be seen that the nose 187 of said interponent is positioned below and out of range of the nose 188 of interponent 184. In Fig. 9 there is illustrated the upper or active position of interponent 183 in which the noses 187 and 188 are aligned end to end. In columns in which it is desired that the contacts 182 be closed when the magnet 177 in the next column to the left is energized, the interponent 183 is set in its upper active position. Each interponent 184 is pivotally connected at its upper end to the armature of the magnet 177 of the next column to the left and is guided in a suitable comb plate 193. Each interponent 184 has, in the edge opposite the nose 188, a cutout 194 into which a bail bar 195 is cyclically projected when the interponent is in its lower position; that is, not raised by magnet 177. The bail bar 195 is supported on pivoted side arms 196 which are engaged by cams 197 on a shaft 198 which makes one rotation during each machine cycle. Springs 199 restore bail 195. The cams 197 are formed in such manner as to maintain bail bar 195 in projected position for the seven tenths of the cycle devoted to printing.

If an interponent 183 is set in its upper active position (Fig. 9) and the magnet 177 in the next column to the left is energized to raise the associated interponent 184, then, when bail bar 195 is advanced it engages the interponent 184 below the cutout 194 and swings it about its pivot. When interponent 184 swings, nose 188 engages nose 187 and the interponent 183 is swung also to close the contacts 182. A spring 200 is provided to restore each interponent 184, the interponents 183 being restored by the spring action of the contacts 182.

It will be seen therefore that, by setting switches 171 and the levers 190 in the appropriate positions, all of the zeroes punched in the card will be printed, and that by setting the switches and the levers in the opposite manner, punched zeroes will be printed only in those columns to the right of one in which a digit 1–9 is printed.

In order not only to print zeroes in those columns which are immediately to the right of columns in which digits 1–9 are printed, but rather to print zeroes in all columns to the right of one in which a digit 1–9 is printed, the following column to column coupling means is provided. The lower end of each interponent 183 is provided with leftwardly and rightwardly extending branches 201 and 202, respectively. The leftward branches 201 extend straight out from the interponents, but the rightward branches 202 are offset rearwardly so that they extend behind the leftward branch 201 of the next interponent to the right.

The construction is such that if one interponent 183 is swung to close its contacts 182, all of the interponents 183 to the right of it are swung also, assuming, of course, that all of said interponents are in their upper active positions. The setting of an interponent 183 in its lower position interrupts the coupling to the columns to the right thereof.

In the present instance the device shown in Figs. 8, 9 and 10 comprises a separately framed unit which is connected with the printing mechanism by suitable conductors and by a suitable coupling between the shaft 198 and the shaft 100. It is to be understood, however, that in a complete machine with which a long line of characters can be printed, this separately framed unit would be made a part of the overall machine. In short, the construction illustrated and described is a model form of the device, the same as the actual printing unit.

It will be seen that the invention provides a single printing reed for each vertical column of the dot grid of Fig. 14, means for projecting the reeds against an ink ribbon, circuit control means for enabling the reed projecting means to affect selected reeds at selective times and settable zero elimination control means. Also, while reference is made to "column," it is to be understood that the word is intended to embrace "row" or "line" as it is evident that the five single printing reeds could be arranged in one column to form a letter out of a twenty-five spot pattern.

It is evident that the connections for the contacts 137 and for the relays 135 and 136 may be arranged accordingly when it is desired to print the information contained in 90 column cards which utilize a different perforation code. These connections need not be described as shown, however, as they merely involve obvious changes in the wiring. It is to be mentioned, however, that if desired, the circuits may be wired for both the 80 and 90 column codes with a switch being provided to energize one or the other.

If desired the translating circuit of the invention may be utilized to control dot printing means of various types. For example, the brushes 126 (1–35) may be replaced by suitably positioned electrodes adapted to print dots on treated paper; or, each brush 126 may energize an electro-magnet control for a hammer adapted to project a wire against an ink ribbon, one wire being provided for each dot of the grid.

While I have described what I consider to be highly desirable embodiments of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent, is

1. In a printing device with which the outlines of all of the printed characters are formed of differential combinations of the dots of a grid of dots arranged in columns, the combination of a single row of printing reeds for forming said dots, one reed in each column of the grid, means only being used to print for repeatedly reciprocating the respective columnar reeds a predetermined number of times in each operating cycle to print any or all of the dots in each of the respective columns to formulate a designated character, an individual latch for each said reed to prevent its projection, and control means to trip said latches selectively.

2. In a printing device with which the outlines of all of the printed characters are formed of differential combinations of the dots of a grid of dots arranged in columns, the combination of a fixed holder and a frame slidable in said holder, a plurality of printing reeds carried by said frame and movable therewith to printing position, one reed only being used to print in each column of the grid means for repeatedly reciprocating the frame and the respective columnar reeds a predetermined number of times in each operating cycle to print any or all of the dots in each of the respective columns to formulate a designated character, individual latches in said holder adapted to restrain said reeds from reciprocating with the frame, control means for tripping said latches selectively, and spring means carried by said frame and engaging each reed to cause the latter to reciprocate with the frame when its latch is tripped.

3. In a printing machine with which the outlines of all of the printed characters are formed of differential combinations of the dots of a grid of dots arranged in columns, the combination of a fixed holder and a frame slidable in said holder, a plurality of printing reeds carried by said frame, one reed only for each column of the grid, means for repeatedly reciprocating the frame and the respective columnar needs in predetermined number of times in each operating cycle to print any or all of the dots in each of the respective columns to formulate a designated character, means for feeding paper past said reeds with a continuous movement, said reciprocating means and said feed means operating in synchronism, an individual latch in the holder for each of said reeds to prevent the latter from reciprocating with said frame, individual trips for said latches, control means to operate said trips selectively to free the reeds to reciprocate with the frame once for each of any of the dots in the associated columns of the grid, and a spring for each reed to cause the latter to reciprocate as one with the frame when the associated latch is tripped.

4. In a printing device with which the outlines of all of the printed characters are formed of differential combinations of the dots of a grid of dots arranged in columns, the combination of a holder and a frame movable in said holder, a plurality of printing reeds carried by said frame, one reed only for each column of said grid, means for repeatedly reciprocating the frame and the respective columnar reeds a predetermined number of times in each operating cycle to print any or all of the dots in each of the respective columns to formulate a designated character, means for feeding paper past the reeds with a continuous movement, said reciprocating means and said feed means operating in synchronism, an individual latch in the holder for each of said reeds to prevent the latter from reciprocating with the frame, individual trips for said latches, control means to operate said trips selectively to free the reeds for one or more reciprocations with the frame, and a spring for each reed to cause the latter to reciprocate as one with the frame when the associated latch is tripped.

5. In a printing device with which the outlines of all of the printed characters are formed of differential combinations of the dots of a grid of dots arranged in columns, the combination of a fixed holder and a reciprocating frame, a plurality of printing reeds carried by said frame, one for each column of said grid, means for reciprocating said frame once for each dot in a said col- and also a plurality of other times to provide a vertical spacing between printed characters, means for feeding paper past the reeds with a continuous movement, said reciprocating means and said feed means operating in synchronism, an individual latch in the holder for each of said reeds to prevent the latter from reciprocating with the frame, individual trips for said latches, control means to operate said trips selectively to free the reeds for one or more reciprocations with the frame, and a spring for each reed to cause the latter to reciprocate as one with the frame when the associated latch is tripped.

6. In a printing device with which the outlines of all of the printed characters are formed of differential combinations of the dots of a grid of dots arranged in columns, the combination of a fixed holder and a reciprocating frame, a plurality of printing reeds carried by said frame, one for each column of said grid, means for reciprocating said frame once for each dot in a said column and also a plurality of other times to provide a vertical spacing between printed characters, means for feeding paper past the reeds with a continuous movement, one dot space for each reciprocation of the frame, said reciprocating means and said feed means operating in synchronism, an individual latch on the holder for each of said reeds to prevent the latter from reciprocating with the frame, individual trips for said latches, control means to operate said trips selectively to free the reeds for one or more reciprocations with the frame, and a spring for each reed to cause the latter to reciprocate as one with the frame when the associated latch is tripped.

7. In a printing device with which the outlines of all of the printed characters are formed of differential combinations of dots of a grid of dots arranged in columns, the combination of a fixed holder and a reciprocating frame, a plurality of reeds carried by said frame, one for each column of said grid, means for reciprocating said frame once for each dot in a said column, individual latches in said holder to restrain said reeds from reciprocating with the frame, individual trips for said latches, a spring for each reed to cause the latter to reciprocate as one with the frame when freed from its latch, means for feeding paper past the reeds with a continuous movement, said reciprocating means and said feed means operating in synchronism, and control means for operating said trips selectively to free the reeds for one or more reciprocations with the frame, including a commutator having a segment for each trip, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, and means to close circuits through said conductors selectively.

8. In a printing device with which the outlines of all of the printed characters are formed of differential combinations of dots of a grid of dots arranged in columns, the combination of a fixed holder and a reciprocating frame, a plurality of reeds carried by said frame, one for each column of said grid, means for reciprocating said frame once for each dot in a said column, individual latches in the holder to restrain said reeds from reciprocating with the frame, individual electro-magnetic trips for said latches, a spring for each reed to cause the latter to reciprocate as one with the frame when freed from its latch, means for feeding paper past the reeds with a continuous movement, said reciprocating means and said feed means operating in synchronism, and control means for operating said trips selectively to free the reeds for one or more reciprocations with the frame, including a commutator rotated in timed relation to the reciprocations of said frame, and having a plurality of segments connected each with one of said trips, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, and means to close circuits for said trips through said conductors selectively.

9. In a printing device with which the outlines of all binations of dots of a grid of dots arranged in columns, the combinations of a fixed holder and a reciprocating frame, a plurality of reeds carried by said frame, one for each column of said grid, means for reciprocating said frame once for each dot in a said column, individual latches in said holder to restrain said reeds from reciprocating with the frame, individual electromagnetic trips for said latches, a spring for each reed to cause the latter to reciprocate as one with the frame when freed from its latch, means for feeding paper past the reeds with a continuous movement, said reciprocating means and said feed means operating in synchronism, and control means for operating said trips selectively to free the reeds for one or more reciprocations with the frame, including a commutator rotated in timed relation to the reciprocations of said frame, and having a plurality of segments connected each with one of said trips, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, a pair of normally open contacts terminating the conductor or conductors associated with each character, a plurality of relays each controlling the closure of a group of said contact pairs, a circuit for said trips through the associated character conductors, closed by one contact pair of each group, a plurality of other circuits for said trips, each including a contact pair in each group, a normally open contact pair in each of said other circuits, a second relay to close each latter said contact pair, and control means for energizing the relays selectively.

10. In a printing device with which the outlines of all of the printed characters are formed of differential combinations of dots of a grid of dots arranged in columns, the combination of a fixed holder and a reciprocating frame, a plurality of reeds carried by said frame, one for each column of said grid, means for reciprocating said frame once for each dot in a said column, individual latches in said holder to restrain said reeds from reciprocating with the frame, individual electromagnetic trips for said latches, a spring for each reed to cause the latter to reciprocate as one with the frame when freed from its latch, means for feeding paper past the reeds with a continuous movement, said reciprocating means and said feed means operating in synchronism, and control means for operating said trips selectively to free the reeds for one or more reciprocations with the frame, including a commutator rotated in timed relation to the reciprocations of said frame, and having a plurality of segments connected each with one of said trips, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, a pair of normally open contacts terminating the conductor or conductors associated with each character, a relay for each digit 1–9, each controlling the closure of a group of said contact pairs, a circuit for said trips through the character conductors associated with the digits 1–9, closed by one contact pair of each group, a plurality of other relays, a normally open contact pair closed by each of the latter of said relays, circuits for said trips through the other character conductors, completed, each by the closure of a latter of said contact pair and a contact pair of any of said groups, and control means for energizing the relays selectively.

11. In a printing device with which the outlines of all of the printed characters are formed of differential combinations of dots of a grid of dots arranged in columns, the combination of a fixed holder and a reciprocating frame, a plurality of reeds carried by said frame, one for each column of said grid, means for reciprocating said frame once for each dot in a said column, individual latches in the holder to restrain said reeds from reciprocating with the frame, individual electro-magnetic trips for said latches, a spring for each reed to cause the latter to reciprocate as one with the frame when freed from its latch, means for feeding paper past the reeds with a continuous movement, said reciprocating means and said feed means operati.ıg in synchronism, and control means for operating said trips selectively to free the reeds for one or more reciprocations with the frame, including a commutator rotated in timed relation to the reciprocatoins of said frame, and having a plurality of segments connected each with one of said trips, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, a pair of normally open contacts terminating the conductor or conductors associated with each character, a relay for each digit 1–9, each controlling the closure of a group of said contact pairs, a circuit for said trips through the character conductors associated with the digits 1–9, closed by one contact pair of each group, a plurality of other relays, a normally open contact pair closed by each latter said relay, circuits for said trips through the other character conductors, completed, each by the closure of a latter said contact pair and a contact pair of any of said groups, a normally closed contact pair associated with each said other relay to open the first said trip circuit, and control means for energizing the relays selectively.

12. In a printing device with which the outlines of all of the printed characters are formed of differential combinations of dots of a grid of dots arranged in columns, the combination of a fixed holder and a reciprocating frame, a plurality of reeds carried by said frame, one for each column of said grid, means for reciprocating said frame once for each dot in a said column, individual latches in the holder to restrain said reeds from reciprocating with the frame, individual electro-magnetic trips for said latches, a spring for each reed to cause the latter to reciprocate as one with the frame when freed from its latch, means for feeding paper past the reeds with a continuous movement, said reciprocating means and said feed means operating in synchronism, and control means for operating said trips selectively to free the reeds for one or more reciprocations with the frame, including a commutator rotated in timed relation to the reciprocations of said frame, and having a plurality of segments connected each with one of said trips, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, a pair of normally open contacts terminating the conductor or conductors associated with each character, a relay for each digit 1–9, each controlling the closure of a group of said contact pairs, a circuit for said trips through the character conductor associated with the digits 1–9, closed by one contact pair of each group, a plurality of other relays, a normally open contact pair closed by each latter said relay, circuits for said trips through the other character conductors, completed, each by the closure of a latter said contact pair and a contact pair of any of said groups, a circuit to shunt the terminal contacts of one of said character conductors including a normally open contact pair associated with one of the latter said relays and a closed contact associated with each of said digital relays, and control means for energizing the relays selectively.

13. In a printing device with which the outlines of all of the printed characters are formed of differential combinations of dots of a grid of dots arranged in columns, the combination of a fixed holder and a reciprocating frame, a plurality of reeds carried by said frame, one for each column of said grid, means for reciprocating said frame once for each dot in a said column, individual latches in the holder to restrain said reeds from reciprocating with the frame, individual electro-magnetic trips for said latches, a spring for each reed to cause the latter to reciprocate as one with the frame when freed from its latch, means for feeding paper past the reeds with a continuous movement, said reciprocating means and said feed means operating in synchronism, and control means for operating said trips selectively to free the reeds for one or more reciprocations with the frame, including a commutator rotated in timed relation to the reciprocations of said frame, and having a plurality of segments connected each with one of said trips, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, a pair of normally open contacts terminating the conductor or conductors associated with each character, a relay for each digit 1–9, each controlling the closure of a group of said contact pairs, a circuit for said trips through the character conductors associated with the digits 1–9, closed by one contact pair of each group, a plurality of other relays, a normally open contact pair closed by each latter said relay, circuits for said trips through the other character conductors, completed, each by the closure of a latter said contact pair and a contact pair of any of said groups, a normally closed contact pair associated with each said other relay to open the first said trip circuit, and a circuit to shunt the terminal contacts of one of said character conductors including a normally open contact pair associated with one of the latter said relays and a closed contact associated with each of said digital relays, the last said contacts also being in series in the first said trip circuit so that energization of one digital relay only is effective, and control means for energizing the relays selectively.

14. In a printing device with which the outlines of all of the printed characters are formed of differential combinations of dots of a grid of dots arranged in columns, the combination of a fixed holder and a reciprocating frame, a plurality of reeds carried by said frame, one for each column of said grid, means for reciprocating said frame once for each dot in a said column, individual latches in the holder to restrain said reeds from reciprocating with the frame, individual electro-magnetic trips for said latches, a spring for each reed to cause the latter to reciprocate as one with the frame when freed from its latch, means for feeding paper past the reeds with a continuous movement, said reciprocating means and said feed means operating in synchronism, and control means for operating said trips selectively to free the reeds for one or more reciprocations with the frame, including a commutator rotated in timed relation to the reciprocations of said frame, and having a plurality of segments connected each with one of said trips, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, a pair of normally open contacts terminating the conductor or conductors associated with each character, a relay for each digit 1–9, each controlling the closure of a group of said contact pairs, a circuit for said trips through the character conductors associated with the digits 1–9, closed by one contact pair of each group, a plurality of other relays, a normally open contact pair closed by each latter said relay, circuits for said trips through the other character conductors, completed, each by the closure of a latter said contact pair and a contact pair of any of said groups, control means for energizing the relays selectively, a normally closed contact pair associated with each said other relay to open the first said trip circuit, a circuit to shunt the terminal contacts of one of said character conductors including a normally open contact pair associated with one of the latter said relays and a closed contact associated with each of said digital relays, the last said contacts also being in series in the first said trip circuit so that energization of one digital relay only is effective, means to open said shunt circuit, and means to close the opened shunt circuit in printing columns to the right of ones in which a digit 1–9 is printed.

15. In a printing device with which the outlines of all of the printed characters are formed of differential combinations of dots of a grid of dots arranged in columns, the combination of a fixed holder and a reciprocating frame, a plurality of reeds carried by said frame, one for each column of said grid, means for reciprocating said frame once for each dot in a said column, individual latches in said holder to restrain said reeds from reciprocating with the frame, individual electromagnetic trips for said latches, a spring for each reed to cause the latter to reciprocate as one with the frame when freed from its latch, means for feeding paper past the reeds with a continuous movement, said reciprocating means and said feed means operating in synchronism, and control means for operating said trips selectively to free the reeds for one or more reciprocations with the frame, including a commutator rotated in timed relation to the reciprocations of said frame, and having a plurality of segments connected each with one of said trips, a plurality of brushes associated with each segment and contacted seriatim thereby, one brush for each dot in the associated column of the grid, one or more conductors for each character to be printed, said conductors being connected with the brushes required in printing the characters represented thereby, rectifiers inserted between said conductors and said brushes to prevent back circuits, a pair of normally open contacts terminating the conductor or conductors associated with each character, a relay for each digit 1–9, each controlling the closure of a group of said contact pairs, a circuit for said trips through the character conductors associated with the digits 1–9, closed by one contact pair of each group, a plurality of other relays, a normally open contact pair closed by each latter said relay, circuits for said trips through the other character conductors, completed, each by the closure of a latter said contact pair and a contact pair of any of said groups, control means for energizing the relays selectively, a normally closed contact pair associated with each said other relay to open the first said trip circuit, a circuit to shunt the terminal contacts of one of said character conductors including a normally open contact pair associated with one of the latter said relays and a closed contact associated with each of said digital relays, the last said contacts also being in series in the first said trip circuit so that energization of one digital relay only is effective, means to open said shunt circuit, and means to close the opened shunt circuit in printing columns to the right of ones in which a digit 1–9 is printed, including a pair of normally open contacts, a cyclically operated member, an interponent disposable in the path of said member, electromagnetic means so to dispose said interponent, energized by the completion of a trip circuit through any of the character conductors for the digits 1–9 in the next column to the left, a second interponent hand settable between the first interponent and the open contacts to close the latter on operation of said member, and couplers between adjacent second interponents to carry their action rightward.

16. In a printing device with which the outlines of all of the printed characters are formed of differential combinations of dots of a grid of dots, the combination of movable dot printing means, trip means for arresting movement of said printing means and circuit means for controlling the trip means including a terminal member for each dot of the grid, one or more character conductors for each character to be printed, rectifiers connecting said character conductors with the appropriate terminal members, a normally open contact pair terminating the conductor or conductors for each character, a plurality of relays each controlling the closure of a group of said contact pairs, a circuit for said trip means through the associated character conductors closed by one contact pair of each group, a plurality of other circuits for said trip means, each including a contact pair in each group, a second normally open contact pair in each said other circuit, a second relay to close each latter said contact pair to complete the associated other circuits, and control means for energizing the relays selectively.

17. In a printing device with which the outlines of all of the printed characters are formed of differential combinations of dots of a grid of dots, the combination of movable dot printing means, trip means for arresting movement of said printing means and circuit means for controlling the trip means, including a terminal member for each dot of the grid, one or more character conductors for each character to be printed, rectifiers connecting said character conductors with the appropriate terminal members, a normally open contact pair terminating the conductor or conductors for each character, a plurality of relays each controlling the closure of a group of said contact pairs, each group containing a contact pair for a digit 1–9 and a plurality of pairs each for a letter a–z, a circuit for said trip means through the associated character conductors closed by the digit contact pair of each group, a plurality of other circuits for said trip means, each including an alphabetic contact pair in each group, a second normally open contact pair in each said other circuit, a second relay to close each latter said contact pair to complete the associated other circuits, and control means for energizing the relays selectively.

18. In a printing device with which the outlines of all of the printed characters are formed of differential combinations of dots of a grid of dots, the combination of dot printing means and circuit means for controlling the printing means, including a terminal member for each dot of the grid, one or more character conductors for each character to be printed, rectifiers connecting said character conductors with the appropriate terminal members, a normally open contact pair terminating the conductor or conductors for each character, a plurality of relays each controlling the closure of a group of said contact pairs, each group containing a contact pair for a digit 1–9 and a plurality of pairs each for a letter a–z, a circuit for said trips through the associated character conductors closed by the digit contact pair of each group, a plurality of other circuits for said trips, each including an alphabetic contact pair in each group, a second normally open contact pair in each said other circuit, a second relay to close each latter said contact pair, control means for energizing the relays selectively, and a normally closed contact associated with each second relay to open the first said trip circuit.

19. In a printing device with which the outlines of all of the printed characters are formed of differential combinations of dots of a grid of dots, the combination of dot printing means and circuit means for controlling the printing means, including a terminal member for each dot of the grid, one or more character conductors for each character to be printed, rectifiers connecting said character conductors with the appropriate terminal members, a normally open contact pair terminating the conductor or conductors for each character, a plurality of relays each controlling the closure of a group of said contact pairs, each group containing a contact pair for a digit 1–9 and a plurality of pairs each for a letter a–z, a circuit for said trips through the associated character conductors closed by the digit contact pair of each group, a plurality of other circuits for said trips, each including an alphabetic contact pair in each group, a second normally open contact pair in each said other circuit, a second relay to close each latter said contact pair, control means for energizing the relays selectively, a circuit to shunt the terminal contacts of the letter O character conductor including a normally open contact pair associated with one of said second relays and a closed contact associated with each first relay and a normally closed contact pair associated with each second relay to open the first said trip circuit.

20. In a printing device with which the outlines of all of the printed characters are formed of differential combinations of dots of a grid of dots, the combination of dot printing means and circuit means for controlling the printing means, including a terminal member for each dot of the grid, one or more character conductors for each character to be printed, rectifiers connecting said character conductors with the appropriate terminal members, a normally open contact pair terminating the conductor or conductors for each character, a plurality of relays each controlling the closure of a group of said contact pairs, each group containing a contact pair for a digit 1–9 and a plurality of pairs each for a letter a–z, a circuit for said trips through the associated character conductors closed by the digit contact pair of each group, a plurality of other circuits for said trips, each including an alphabetic contact pair in each group, a second normally open contact pair in each said other circuit, a second relay to close each latter said contact pair, control means for energizing the relays selectively, a normally closed contact pair associated with each second relay to open the first said trip circuit, a circuit to shunt the terminal contacts of the letter O character conductor including a normally open contact pair associated with one of the second relays and a closed contact associated with each first said relay, the last said contacts also being in series in the first said trip circuit so that only one digit contact pair is effective, means to open said shunt circuit, and means to close the opened shunt circuit in printing columns to the right of ones in which a digit 1–9 is printed.

21. In a printing device with which the outlines of all of the printed characters are formed of differential combinations of dots of a grid of dots, the combination of dot printing means and circuit means for controlling the printing means, including a terminal member for each dot of the grid, one or more character conductors for each character to be printed, rectifiers connecting said character conductors with the appropriate terminal members, a normally open contact pair terminating the conductor or conductors for each character, a plurality of relays each controlling the closure of a group of said contact pairs, each group containing a contact pair for a digit 1–9 and a plurality of pairs each for a letter a–z, a circuit for said trips through the associated character conductors closed by the digit contact pair of each group, a plurality of other circuits for said trips, each including an alphabetic contact pair in each group, a second normally open contact pair in each said other circuit, a second relay to close each latter said contact pair, control means for energizing the relays selectively, a normally closed contact pair associated with each second relay to open the first said trip circuit, a circuit to shunt the terminal contacts of the letter O character conductor including a normally open contact pair associated with one of the second relays and a closed contact associated with each first said relay, the last said contacts also being in series in the first said trip circuit so that only one digit contact pair is effective, means to open said shunt circuit, and means to close the opened shunt circuit in printing columns to the right of ones in which a digit 1–9 is printed, including a pair of normally open contacts, a cyclically operated member, an interponent disposable in the path of said member electro-magnetic means to so dispose said interponent, energized by the completion of a trip circuit through any of the character conductors for the digits 1–9 in the next column to the left, a second interponent hand settable between the first interponent and the open contacts to close the latter on operation of said member, and couplers between adjacent second interponents to carry their action rightward.

22. In a multichannel printer including circuits to print the digits 0–9 in each column and means to operate said circuits, the combination of settable means to open the zero printing circuit, a shunt for said zero circuit closed by said settable means when the zero circuit is opened, a pair of normally opened contacts in said shunt circuit, an operating member advanced cyclically, an interponent settable in the path of said member, electromagnetic means so to set the interponent, energized on operations of any of the 1–9 printing circuits in the next column to the left, a second interponent settable between the first and said contacts to close the latter when said member advances, and couplers connecting the second interponent to carry their action to the right.

23. In a machine for printing dots columnwise in row by row order to delineate a character on a moving web including a carrier, means for reciprocating the carrier toward and away from the web a predetermined number of times in each operating cycle to print any or all of the dots in each of the respective columns to formulate said character, a single row of dot printing elements in said carrier, means for yieldably connecting the elements to said carrier for movement therewith to impinge the web in printing action, latch means for holding the elements from moving with said carrier and means for selectively actuating said latch means.

References Cited in the file of this patent

UNITED STATES PATENTS

| Number | Name | Date |
|---|---|---|
| 1,028,037 | Lilleberg | May 28, 1912 |
| 2,066,984 | Lake | Jan. 5, 1937 |
| 2,129,065 | Loop | Sept. 6, 1938 |
| 2,265,445 | Paris | Dec. 9, 1941 |
| 2,353,083 | Roth | July 4, 1944 |
| 2,524,127 | Johnson | Oct. 3, 1950 |
| 2,632,386 | Hyland | Mar. 24, 1953 |

FOREIGN PATENTS

| Number | Country | Date |
|---|---|---|
| 523,698 | Germany | Aug. 21, 1933 |